(12) United States Patent
Nakano et al.

(10) Patent No.: US 8,898,189 B2
(45) Date of Patent: Nov. 25, 2014

(54) DATABASE MANAGEMENT METHOD, COMPUTER, SENSOR NETWORK SYSTEM AND TIME-SERIES DATA MANAGEMENT METHOD

(75) Inventors: Sadaki Nakano, Kokubunji (JP); Keiro Muro, Koganei (JP); Shinji Fujiwara, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 104 days.

(21) Appl. No.: 13/583,108

(22) PCT Filed: Jul. 22, 2010

(86) PCT No.: PCT/JP2010/062343
§ 371 (c)(1),
(2), (4) Date: Sep. 6, 2012

(87) PCT Pub. No.: WO2011/125237
PCT Pub. Date: Oct. 13, 2011

(65) Prior Publication Data
US 2012/0330931 A1  Dec. 27, 2012

(30) Foreign Application Priority Data
Apr. 9, 2010 (JP) .............................. 2010-090491

(51) Int. Cl.
*G06F 17/30* (2006.01)
*G05B 23/02* (2006.01)

(52) U.S. Cl.
CPC ...... *G05B 23/0283* (2013.01); *G06F 17/30424* (2013.01)
USPC ........................................................ 707/773

(58) Field of Classification Search
CPC ..................... G06F 17/30548; G06F 17/30551
See application file for complete search history.

(56) References Cited

U.S. PATENT DOCUMENTS

| 8,219,574 | B2 * | 7/2012 | Liu et al. ........................ 707/759 |
| 8,321,479 | B2 * | 11/2012 | Bley .............................. 707/809 |
| 2008/0215546 | A1 * | 9/2008 | Baum et al. ....................... 707/3 |
| 2010/0325132 | A1 * | 12/2010 | Liu et al. ........................ 707/759 |

FOREIGN PATENT DOCUMENTS

JP    2002-358117 A    12/2002

OTHER PUBLICATIONS

PCT International Search Report and Written Opinion on application PCT/JP2010/062343 mailed Aug. 24, 2010; 6 pages.

* cited by examiner

*Primary Examiner* — Khanh Pham
(74) *Attorney, Agent, or Firm* — Foley & Lardner LLP

(57) ABSTRACT

In a system manages a plurality of pieces of sensor information in a plant, or the like, it can be reducing an amount of data stored in a database and easily a processing for searching a place of an anomaly and an anomaly cause.

A database management method for use in a computer for managing a database, the database management method including: a step of analyzing a query; a step of generating a first inquiry for searching the database for compressed data; a step of generating a second inquiry for executing a search of time-series data; a step of extracting given data from the obtained time-series data, based on a response result of the second inquiry; and a step of generating an output result by extracting data to be output to a client computer from the given data.

17 Claims, 35 Drawing Sheets

QUERY EXAMPLE 1

350
```
input_items: 'Sensor1', 'Sensor2' ;
select_range: 5;
select_items:
            'Sensor1' as L1 ,
            'Sensor2' as L2 ,
            avg('Sensor2')   as L3  ;
where_timerange: 2009-02-02 00:00:00, 2009-02-20 23:59:59 ;
where_condition:
    ortest(
        GreaterThanOrEqualTo(L1, 70),
        PositiveThreshold(L3, 300, 200)
    ) ;
output_range:60,60;
step: 5 ;
file: result.csv ;
```

QUERY EXAMPLE 2

351
```
input_items: 'Sensor1', 'Sensor2', 'Sensor3' ;
where_timerange: 2009-02-02 00:00:00, 2009-02-20 23:59:59 ;
file: result.csv ;
```

*Fig. 8A*

SQL EXAMPLE 1

352 — select Datetime, SID.Name, DAT.CDATA
from SID join DAT on SID.ID = DAT.ID
where Name in ( 'Sensor1', 'Sensor2' ) and
Datetime between '2009-02-01 23:00:00' and
'2009-02-20 23:59:59'
order by Datetime;

CQL EXAMPLE 1

353 — register stream IN (
   ts__ TIMESTAMP
  , 'Sensor1' REAL, 'Sensor2' REAL);

regiser query GFUNG
   select last(ts__) as L0__
  , **last('Sensor1') as L1 , last('Sensor2') as L2 , avg('Sensor2')
as L3**
from IN [range 5 second ];

register query OUT istream(
   select L0__
  , L1, L2, L3
,
  **ortest( GreaterThanOrEqualTo(L1, 70), PositiveThreshold(L3,
300, 200)**
   ) as CONDITION
from GFUNC);

*Fig. 8B*

360 CHARACTER STRING CUT-OUT PORTION

```
input_items: $input ;
select_range: $range ;
select_items: $select ;
where_timerange: $start , $end ;
where_condition: $cond ;
output_range: $prev , $post ;
step: $step ;
file: $file ;
meta_search: $meta ;
```

370 ⎯ SQL TEMPLATE

```
select Datetime, SID.Name, DAT.CDATA
from SID join DAT on SID.ID = DAT.ID
where Name in ( $db_input ) and
      Datetime between '$db_start' and '$db_end'
order by Datetime;
```

380 — CQL TEMPLATE

```
register stream IN (
  ts__ TIMESTAMP
  $cql_input);

regiser query GFUNG
  select last(ts__) as L0__
  $cql_select
from IN [range $range second ];

register query OUT istream(
  select L0__
  $cql_label
  ,
  $cond as CONDITION
  from GFUNC);
```

*Fig. 12A*

QUERY EXAMPLE 4

700 input_items: 'Sensor1', 'Sensor2', 'Sensor3', 'Sensor4', 'Sensor5', 'Sensor6';
select_range: 5;
select_items:
        'Sensor1' as L1,
        'Sensor2' as L2,
        avg('Sensor2') as L3;
        'Sensor3' as L4,
        'Sensor4' as L5,
        'Sensor5' as L6,
        'Sensor6' as L7;

where_timerange: 2009-01-01 00:00:00, 2009-12-31 23:59:59;
where_condition: graterthan(L1, 100);

output_range:60,60;
step: 5;
file: result.csv;
meta_search: 'Sensor1'.MaxVal > 100;

SQL EXAMPLE 4-1

701 select Datetime
from SID join DAT on SID.ID = DAT.ID
where (Name = 'Sensor1' and MaxVal > 100 ) and
    Datetime between '2009-01-01 00:00:00' and '2009-12-25 23:59:59'
order by Datetime;

SQL EXAMPLE 4-2

702 select Datetime, SID.Name, DAT.CDATA
from SID join DAT on SID.ID = DAT.ID
where Name in ( 'Sensor1', 'Sensor2' ) and
    ( ( Datetime between '2009-02-04 11:00:00' and '2009-02-04 15:59:59' ) or
    ( Datetime between '2009-04-11 02:00:00' and '2009-04-11 05:59:59' ) or
    ( Datetime between '2009-07-18 15:00:00' and '2009-07-18 19:59:59' ) )
order by Datetime;

*Fig. 21*

710 — TIME CUT-OUT-USE SQL TEMPLATE

```
select Datetime
from SID join DAT on SID.ID = DAT.ID
where (Name = $meta_signal and $meta_cond)
      and Datetime
      between '$meta_start' and '$meta_end'
order by Datetime;
```

711 — FEATURE VALUE SEARCH-USE SQL TEMPLATE

```
select Datetime, SID.Name, DAT.CDATA
from SID join DAT on SID.ID = DAT.ID
where Name in ( $db_input ) and
      ($db_dtset)
order by Datetime;
```

*Fig. 22*

DATABASE MANAGEMENT METHOD, COMPUTER, SENSOR NETWORK SYSTEM AND TIME-SERIES DATA MANAGEMENT METHOD

BACKGROUND OF THE INVENTION

This invention relates to a computer system for processing data and a data processing method for the computer system. More particularly, this invention relates to a computer system suitable to process a large amount of data collected for the purpose of the preventive maintenance of factory equipment, plant equipment, or the like, and a data processing method for the computer system.

In a thermal power plant, thousands of sensors are attached to various places in the facility. Those sensors keeps transmitting sensing results on a second-by-second basis, or a millisecond-by-millisecond basis, and the amount of data transmitted over the lifetime of the plant is estimated to be as huge as several ten to several hundred terabytes. A system that manages those pieces of data which are transmitted constantly for years stores a huge amount of data in a database, and the increase of disk capacity of the database has a problem.

On the other hand, in the event of an anomaly in the plant, a manager of the plant needs to quickly identify the cause of the anomaly by analyzing sensor information which is stored in the database. Identifying the cause of the anomaly, however, takes time because it requires checking displayed sensor data (signal) that exhibits an anomalous value on a viewer or the like and issuing queries for search of the huge amount of data in the database many times in order to narrow down possible causes of the problem.

An example of solutions to this is described in JP 2002-358117 A, which solves the problem to increase the disk capacity by storing compressed sensor information in the database. This also quickens the identification of the cause of an anomaly by lowering the count of queries issued to the database.

SUMMARY OF THE INVENTION

However, the method described above has a problem in that a search of compressed data involves deploying data somewhere else first and then searching the deployed data, thereby sacrificing the search speed. In addition, identifying the cause of an anomaly requires issuing, a plurality of times, a search query for searching the sensor information for the place of the anomaly and a search query for tracing the place of the anomaly in order to identify the cause of the anomaly. The resultant problem is an increase in the count of queries issued and in the time required to search for the place of the anomaly.

This invention has been made in view of the problems described above, and it is therefore an object of this invention to reduce the amount of data stored in a database and search a large amount of data efficiently for required data.

A representative example of this invention is as follows. A database management method executed in a computer for managing a database, the computer having a processor and a memory connected to the processor, the database storing a plurality of compressed data which are compressed based on an any condition. The database management method including a first step of analyzing, by the computer, a query for the database which is received from a client computer coupled to the computer. The database management method including a second step of generating, by the computer, a first inquiry for searching the database for at least one of the plurality of compressed data, based on a result of the analysis of the received query. The database management method including a third step of generating, by the computer, a second inquiry for executing a search of a plurality of time-series data obtained from the at least one of the plurality of compressed data, which is a response result of the first inquiry, based on the result of the analysis of the received query. The database management method including a fourth step of issuing, by the computer, the first inquiry to the database and obtaining the at least one of the plurality of compressed data from the database as the response result of the first inquiry. The database management method including a fifth step of obtaining, by the computer, the plurality of time-series data by decompressing the at least one of the plurality of compressed data which has been obtained as the response result of the first inquiry. The database management method including a sixth step of executing, by the computer, the second inquiry for the obtained plurality of time-series data. The database management method including a seventh step of extracting, by the computer, a plurality of any data from the obtained plurality of time-series data, based on a response result of the second inquiry. AND the database management method including an eighth step of generating, by the computer, an output result by extracting data to be output to the client computer from the plurality of any data which has been extracted in the seventh step.

According to this invention, the amount of data stored in the database can be reduced while maintaining practical data, and a large amount of data can be searched efficiently for required data.

BRIEF DESCRIPTION OF THE DRAWINGS

The present invention can be appreciated by the description which follows in conjunction with the following figures, wherein:

FIGS. 8A and 8B are explanatory diagrams illustrating an example of a query, an SQL, and a CQL in this embodiment;

FIG. 12A is an explanatory diagram illustrating a CQL template for generating the CQL in this embodiment;

FIG. 21 is an explanatory diagram illustrating an example of the query and the SQL that are used to execute feature value search processing in this embodiment;

FIG. 22 is an explanatory diagram illustrating SQL templates for generating the SQL that is used for a search of a feature value in this embodiment;

DETAILED DESCRIPTION OF THE PREFERRED EMBODIMENT

Figure 1:
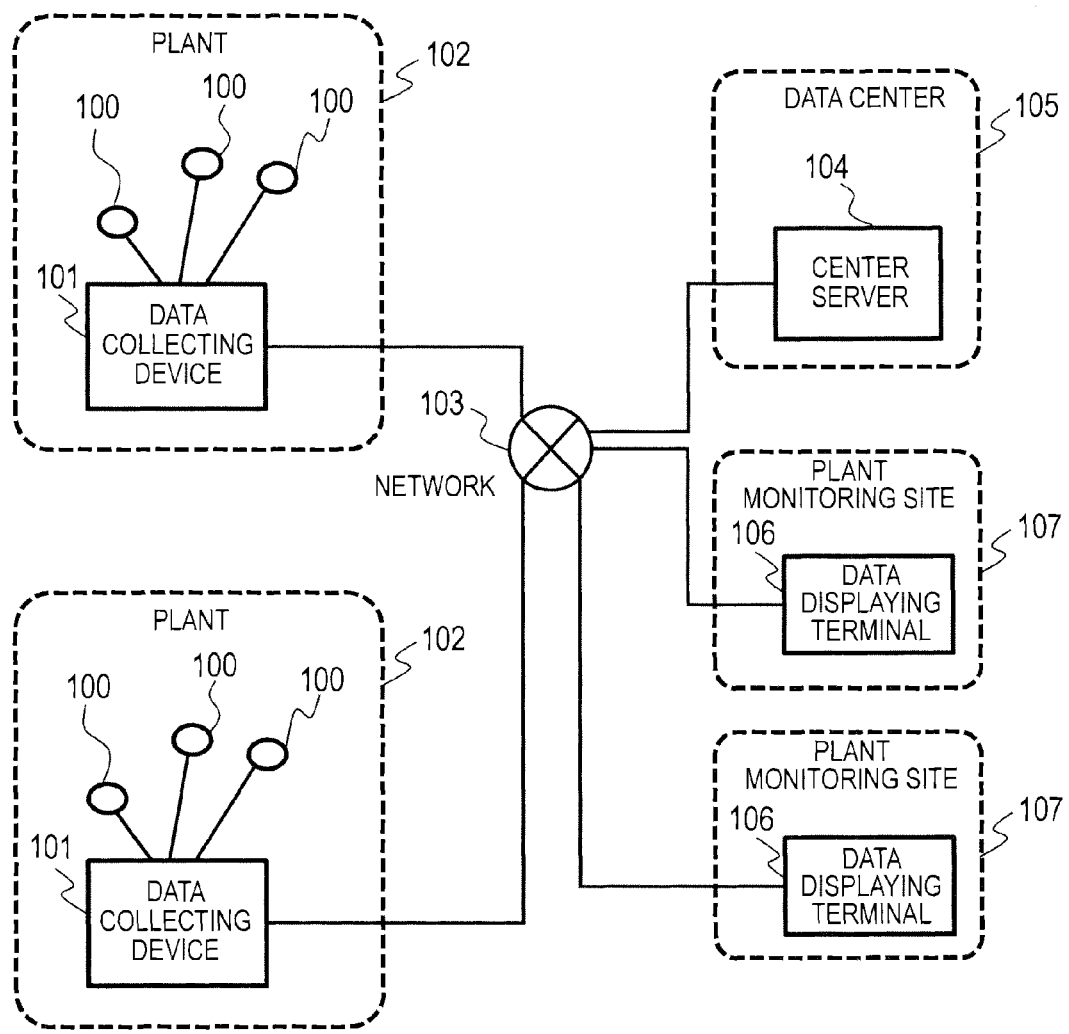
FIG. 1 is a block diagram illustrating a general description of a computer system to which this invention is applied as a sensor network system according to an embodiment of this invention.

FIG. 1 is a block diagram illustrating a general description of a computer system to which this invention is applied as a sensor network system according to an embodiment of this invention.

The sensor network system includes plants 102, a data center 105, and plant monitoring sites 107, which are coupled to one another by a network 103. The network 103 can be, for example, a dedicated line, a wide area network such as the Internet, or a local area network such as a LAN.

The plants 102 each include sensors 100 and a data collecting device 101. The sensors 100 and the data collecting device 101 are connected to each other by a direct connection, or may be coupled to each other via a local area network (LAN), a wireless network, or the like.

The sensors 100 detect various types of data. The sensors 100 include diverse sensors to detect targeted data.

The data collecting device 101 collects data detected by the sensors 100, and transmits the data collected from the sensors 100 to the data center 105 over the network 103. The data collecting device 101 includes a CPU (not shown), a memory (not shown) connected to the CPU, a network interface (not shown) connected to the CPU, and a storage medium (not shown). The data collecting device 101 may also include a display, or an input device or the like.

The data center 105 includes a center server 104 for the integrated management of data transmitted from the data collecting devices 101 of the plurality of plants 102.

The center server 104 stores data transmitted from the data collecting devices 101. The center server 104 takes any data out of the stored data based on a request from a manager via one of the plant monitoring sites 107 or the like, or analyzes the taken out data to output an analysis result.

The concrete device configuration of the center server 104 is described later with reference to FIG. 2.

The plant monitoring sites 107 each include a data displaying terminal 106 for making various inquiries to the data center 105.

The data displaying terminal 106 is for monitoring or viewing, via the network 103, data that is stored in the center server 104. The data displaying terminal 106 includes a CPU (not shown), a memory (not shown) connected to the CPU, a network interface (not shown) connected to the CPU, a storage medium (not shown), a display (not shown), and an input device (not shown).

Figure 2:
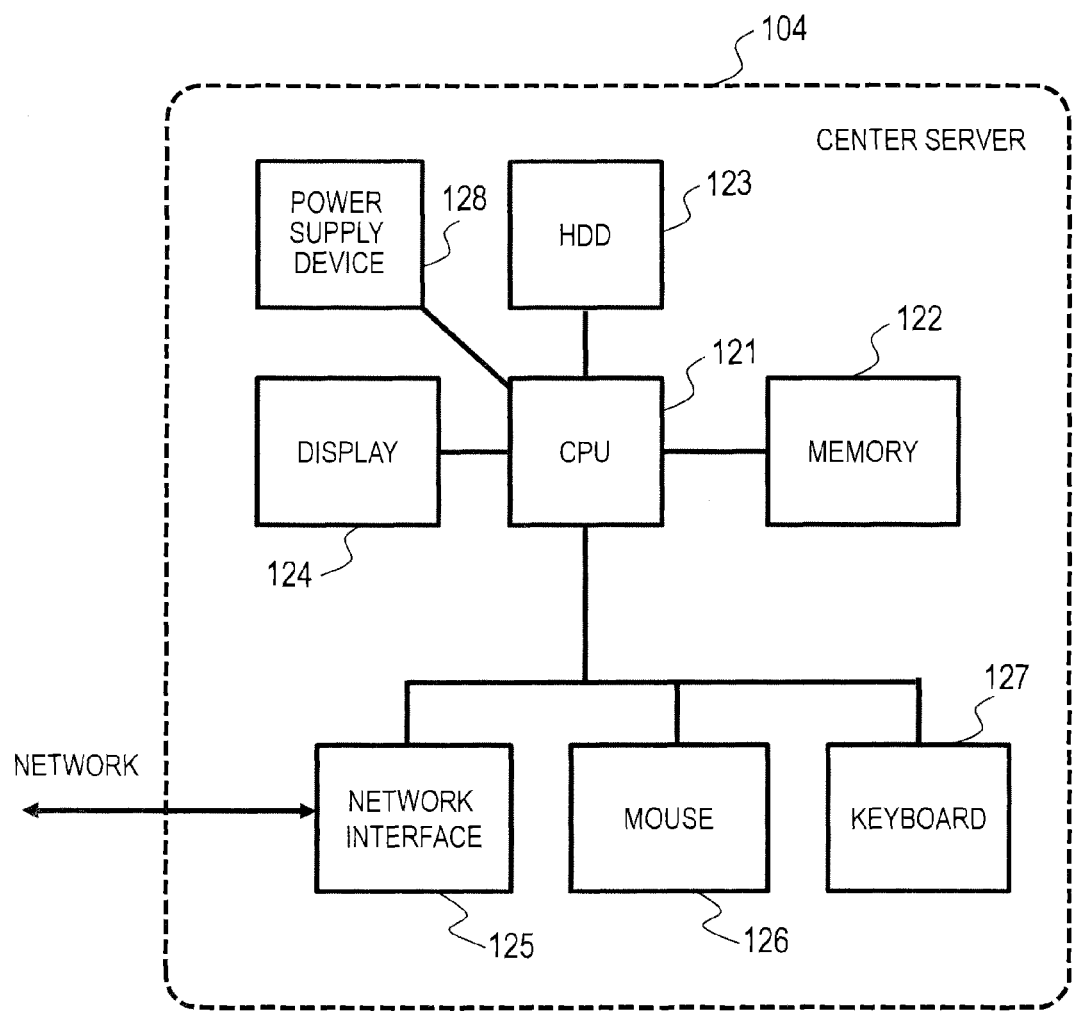
FIG. 2 is a block diagram illustrating a hardware configuration of a center server in this embodiment.

FIG. 2 is a block diagram illustrating the hardware configuration of the center server 104 in this embodiment.

The center server 104 includes a CPU 121, a memory 122, an HDD 123, a display 124, a network interface 125, a mouse 126, a keyboard 127, and a power supply device 128.

The CPU 121 executes a program loaded into the memory 122.

The memory 122 stores a program executed by the CPU 121, and information necessary to execute the program. The memory 122 is also used as a work area which is used by the CPU to execute various types of processing. In this embodiment, programs such as an OS 158 (see FIG. 3), a data loader module 153 (see FIG. 3), a database 154 (see FIG. 3), and a data search module 157 (see FIG. 3) are loaded into the memory 122 by the HDD 123 to be executed.

The HDD 123 stores a program read to the memory 122 and various types of information. While the example of FIG. 2 illustrates only one HDD 123, the center server 104 may include a plurality of HDDs 123 or an array group constituted of a plurality of HDDs 123.

The network interface 125 is an interface for coupling to the network 103.

The power supply device 128 is a device for supplying power to the center server 104.

The display 124 is a device for displaying various types of information to an operator who operates the center server 104. The mouse 126 is a pointing device used by the operator of the center server 104. The keyboard 127 is an input device used by the operator of the center server 104.

Figure 3:
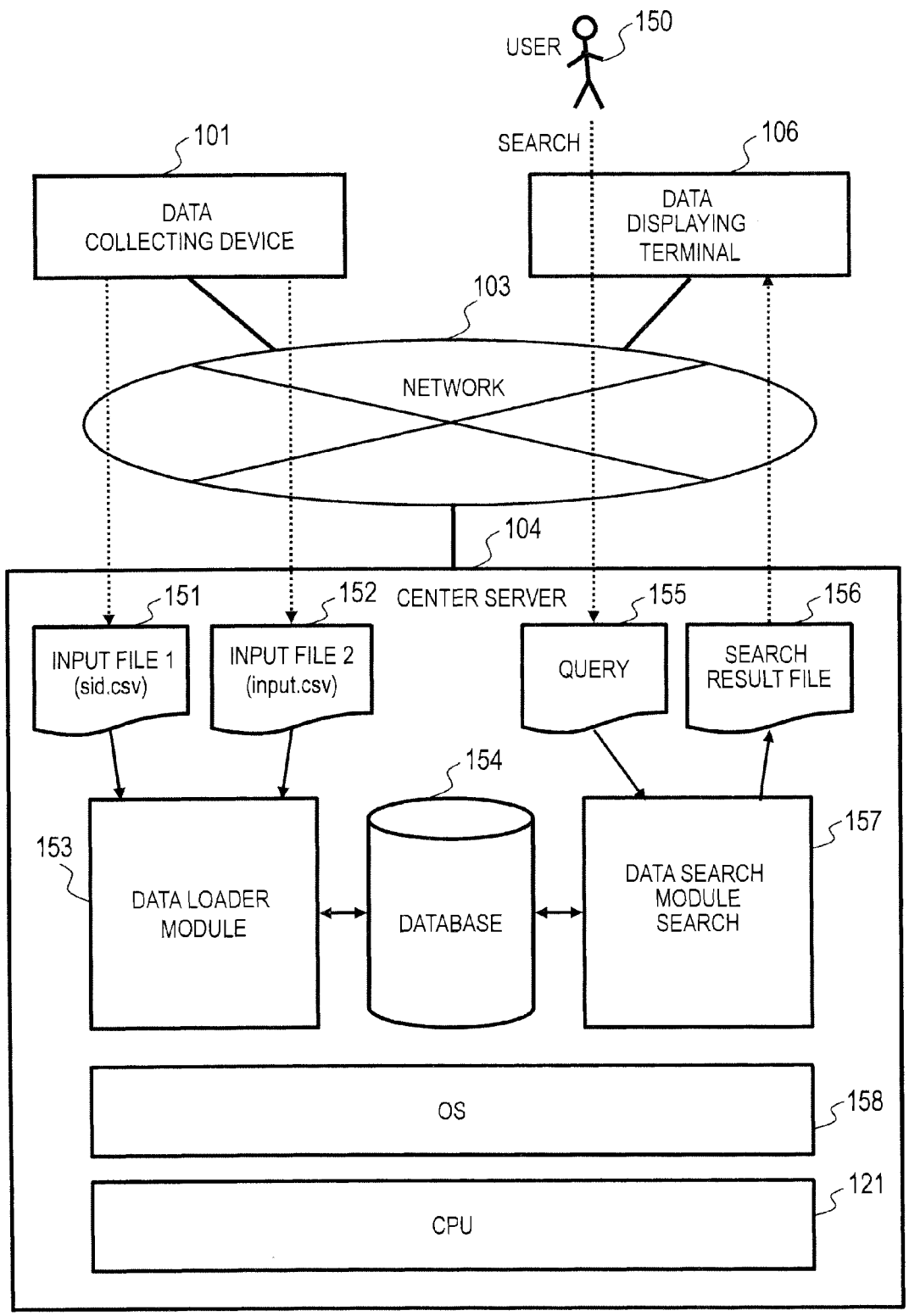
FIG. 3 is a block diagram illustrating a software configuration of the center network system in this embodiment.

FIG. 3 is a block diagram illustrating the software configuration of the center network system in this embodiment.

The operating system (OS) 158 is executed by the CPU 121, on the center server 104. The OS 158 executes various types of processing.

Specifically, the OS 158 executes the data loader module 153, the database 154, and the data search module 157.

The database 154 is management software for managing data that is transmitted from the data collecting devices 101 and converted into any format by the data loader module 153. Details of the data stored in the database 154 are described later with reference to FIG. 4.

The data loader module 153 is software for receiving data from the data collecting devices 101 which are included in the plants 102, via the network 103, converting the received data into any format, and storing the converted data in the database.

In the example of FIG. 3, the data loader module 153 receives from the data collecting device 101 an input file 1 (151) whose file name is "sid.csv" and an input file 2 (152) whose file name is "input.csv", converts the input file 1 (151) and the input file 2 (152) into any format, and stores the converted data in the database 154.

The file 1 (151) and file 2 (152) of FIG. 3 are files of the comma-separated value (CSV) format. In the CSV file format, a plurality of fields are separated from one another by a comma (,). While FIG. 3 deals with an example in which the CSV format is used, the received files may have a file format that separates fields with a tab instead of a comma (the TSV format), or the binary format.

The data search module 157 is software for searching the database 154 for targeted data based on a query that has been input, and outputting a search result.

In the example of FIG. 3, the data search module 157 receives a query 155 from a user 150 who operates the data displaying terminal 106, searches for data based on the query 155, and outputs the result of this data search as a search result file 156. The data displaying terminal 106 reads the search result file 156, converts the data into a numerical character, a graphical waveform, or other formats, and displays the converted data on a screen.

Figure 4:
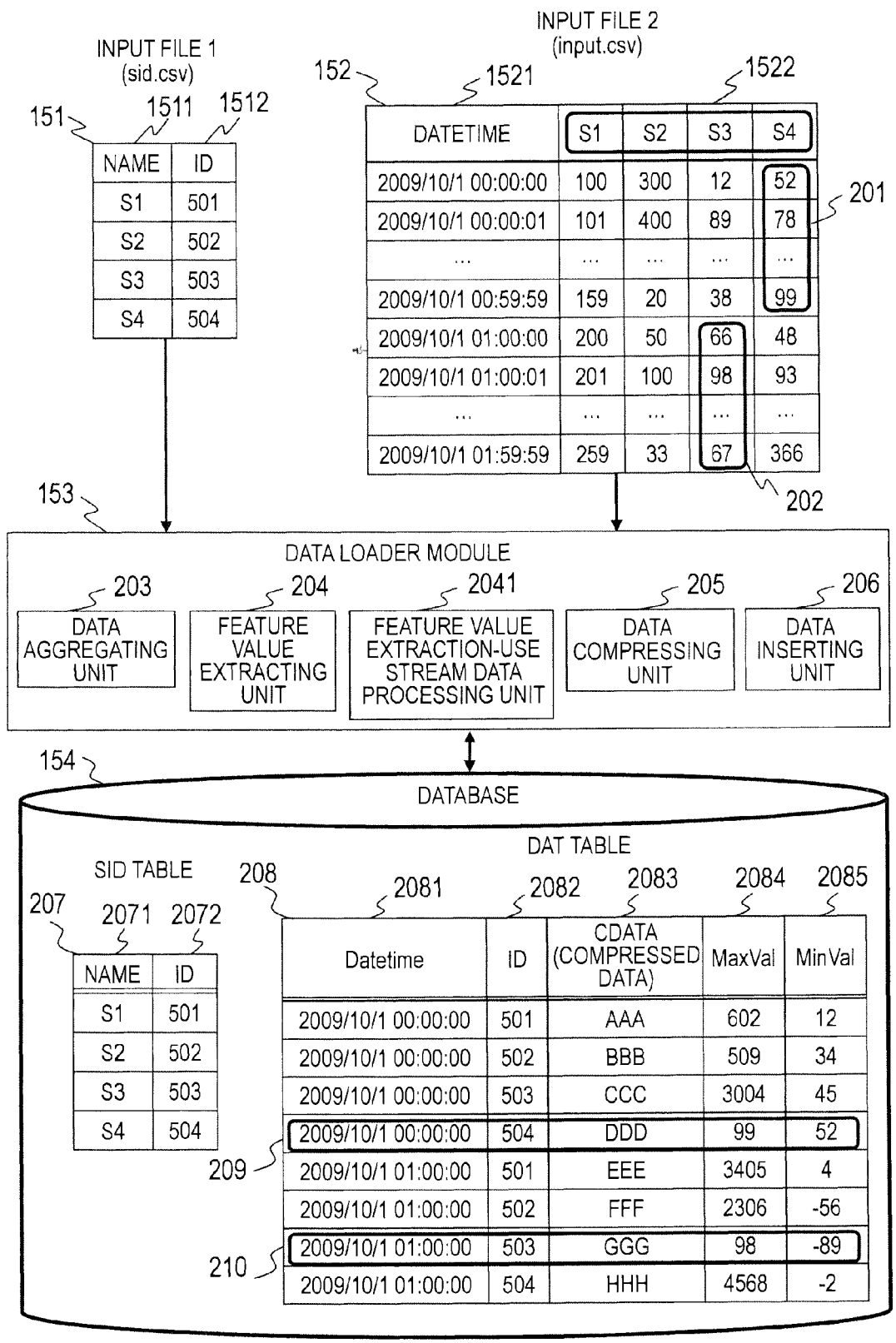
FIG. 4 is a block diagram illustrating a data loader module and a database in this embodiment.

FIG. 4 is a block diagram illustrating the data loader module 153 and the database 154 in this embodiment.

The formats of the input file 1 (151) and the input file 2 (152) and the format of data stored in the database 154 are described first.

The input file 1 (151) includes a Name column 1511 and an ID column 1512.

The Name column 1511 stores the sensor names of the sensors 100 included in the plants 102. The ID column 1512 stores identifiers for uniquely identifying the sensors 100 included in the plants 102.

The input file 2 (152) includes a Datetime column 1521 and a sensor name column 1522.

The Datetime column 1521 stores time information that indicates the times in a case where the sensors 100 have obtained data. The sensor name column 1522 is constituted of the names of the respective sensors 100, and stores sensor names corresponding to those of the Name column 1511. The sub-columns for the sensors 100 which constitute the sensor name column 1522 store values detected by the respective sensors 100.

In the example of FIG. 4, the input file 2 (152) stores data detected for every second by the respective sensors 100.

The database 154 stores an SID table 207 and a DAT table 208.

The SID table 207 includes a Name column 2071 and an ID column 2072.

The Name column 2071 stores the sensor names of the sensors 100 which are included in the plants 102. The ID column 2072 stores identifiers for uniquely identifying the sensors 100 included in the plants 102.

The DAT table 208 stores data obtained by compressing data that is contained in the input file 2 (152) for each sensor 100 for every any count of consecutive time units (time-series data block). Specifically, each row stores data obtained by compressing one hour of sensing data of one of the sensors 100.

The DAT table 208 includes a Datetime column 2081, an ID column 2082, a CDATA column 2083, a MaxVal column 2084, and a MinVal column 2085.

The Datetime column 2081 stores time information that indicates, for each compressed time-series data block, the head time of the compressed time-series data block. Herein, the term "head time" represents the earliest relevant time in the Datetime column 1521, in other words, a time that is the start point of the compressed time-series data block.

The ID column 2082 stores identifiers for identifying the sensors 100. The CDATA column 2083 stores compressed data.

The MaxVal column 2084 stores, for each compressed time-series data block, the maximum value of data contained in the compressed time-series data block. The MinVal column 2085 stores, for each compressed time-series data block, the minimum value of data included in the compressed time-series data block.

In the example of FIG. 4, a compressed time-series data block that is obtained by compressing a data group 201 corresponds to a row 209, and a compressed time-series data block that is obtained by compressing a data group 202 corresponds to a row 210.

For instance, the row 209 indicates that data "DDD" is obtained by compressing one hour of data collected since "2009/10/1 00:00:00" from the sensor 100 whose sensor name is "S4 ", and that the data prior to compression contains "99" as the maximum value and "52" as the minimum value.

In this embodiment, 3600 rows (one hour) of data of the input file 2 (152) is compressed into one row. The time range of data stored in one time-series data block which is fixed to one hour in the following description of this embodiment may be changed to other lengths of time than one hour.

The time range of a time-series data block is determined with the use of a search period that is used most often by users. For example, a period that is 1/10 of the most frequently used period search range is set as the time range of a time-series data block. In this case, the time range of a time-series data block is 2.4 hours in a case where the search range is one day, and is three days in a case where the search range is one month. This is accomplished by a query analyzing unit of the data search module 157 by calculating a time range from a search period that is specified by a where_timerange phrase of a query example 1 of FIG. 8A, and managing the time range as a frequency table.

Alternatively, a minimum period in which a time series changes in feature occur may be used to determine the time range of a time-series data block. A method of obtaining an optimum time-series data block 2605 by dividing a time-series data block 2601 is described with reference to FIG. 26.

Figure 26:
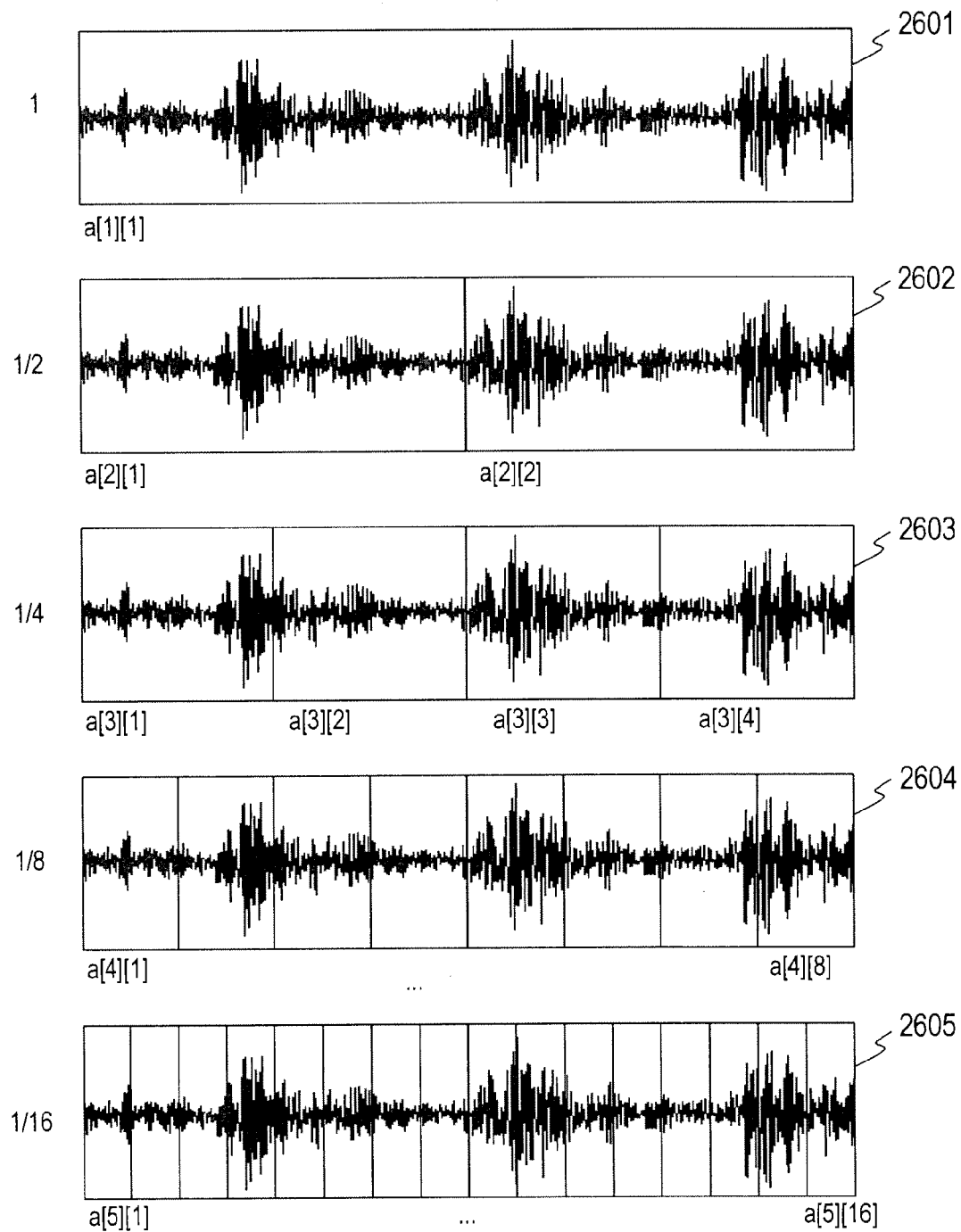
FIG. 26 is a diagram illustrating a method of determining a time range of a time-series data block according to the embodiment of this invention.

FIG. 26 is a diagram illustrating a method of determining the time range of a time-series data block according to the embodiment of this invention.

A feature value a[1][1] is obtained in the time-series data block 2601. The time-series data block is next divided in half to obtain a feature value a[2][1] and a feature value a[2][2]. In a feature value a[i][j], i represents a division level which indicates how many times a time-series data block is divided, and j is a number indicating the place of a time-series data block to which the feature value belongs in the order of time-series data blocks. The processing described above is repeated recursively.

The optimum division level of a time-series data block is defined as a level where the difference between a feature value at the division level i and a feature value at the division level i+1 is equal to or less than a threshold, and the optimum time range is defined as the width of each time-series data block obtained by this division. The difference between the feature value a[i][j] and a feature value a[i+1][j] and the difference between the feature value a[i][j] and a feature value a[i+1][j+1] may be compared so that an average of all time-series data blocks j in terms of the larger value of the two is checked against a threshold as the "difference in feature value".

The used capacity of the database can be reduced by storing compressed data as illustrated in FIG. 4.

The data loader module 153 is described next.

The data loader module 153 includes a data aggregating unit 203, a feature value extracting unit 204, a feature value extraction-use stream data processing unit 2041, a data compressing unit 205, and a data inserting unit 206.

The data aggregating unit 203 aggregates data at any time intervals (one hour in this embodiment) for each sensor 100.

The feature value extracting unit 204 extracts a feature value from compressed data. The feature value is used to search the database 154 for the compressed data. A search method that uses a feature value is described later with reference to FIG. 23. In this embodiment, a maximum value and a minimum value are extracted as feature values from data to be compressed. An average value, a variance value, or any other value that indicates a feature of data to be compressed may be extracted as a feature value.

Figure 25:
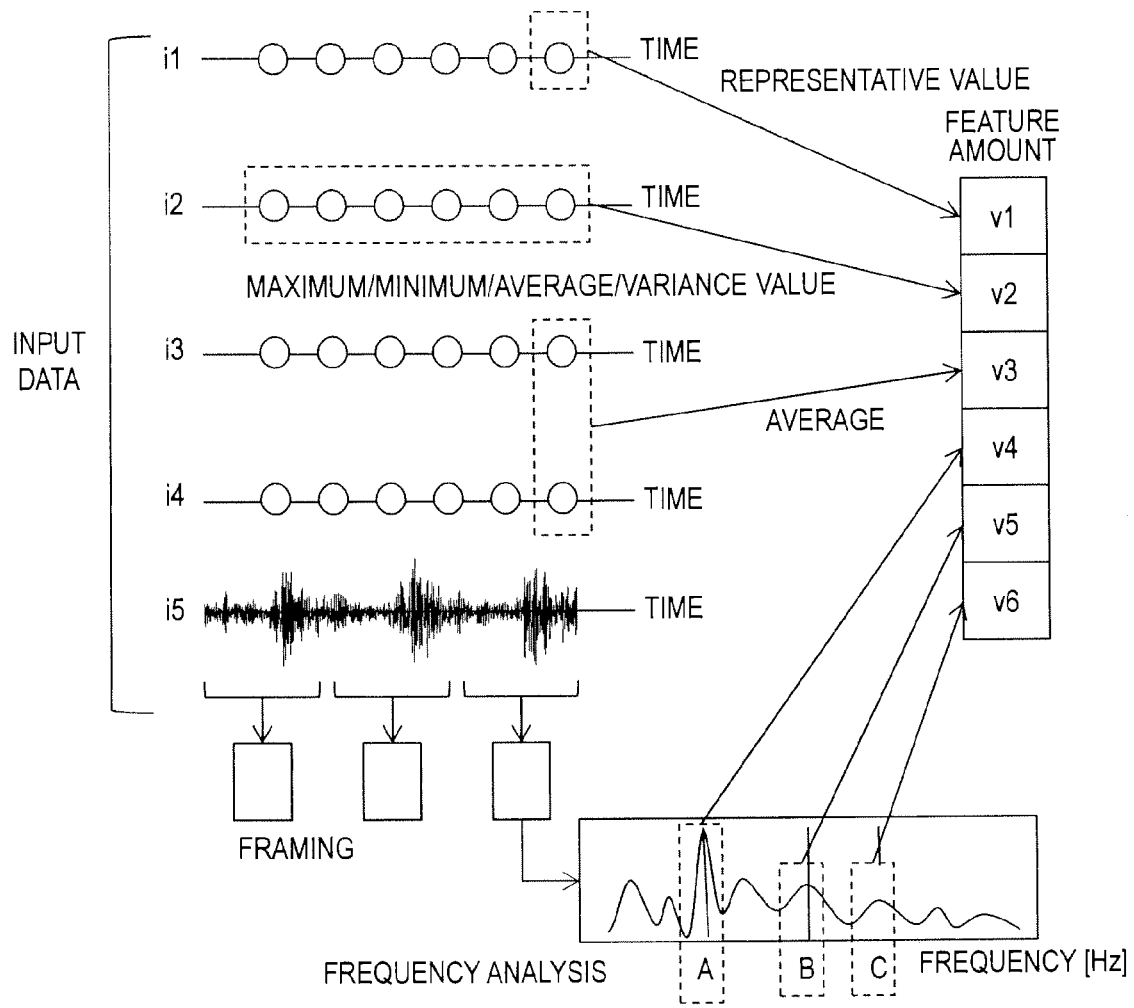
FIG. 25 is a diagram illustrating a kind of the feature value and a method of generating the feature value according to the embodiment of this invention.

Examples of the feature value are described with reference to FIG. 25.

In a case i1, a specific value such as the start point or the end point of compressed data is used as a feature value.

In a case i2, a maximum value, a minimum value, an average value, a variance value, or a standard deviation value in the entire compressed data or in a time series of an arbitrary section is used as a feature value.

In cases i3 and i4, an average value of a plurality of sensing values i3 or a plurality of sensing values i4 is used as a feature value.

In a case i5, the entire compressed data or an arbitrary section is turned into a frame to be transformed into a frequency band by fast Fourier transform (FFT), and amplitudes at frequencies A, B, and C which are specified in advance are used as feature values.

The feature value extracting unit 204 uses the feature value extraction-use stream data processing unit 2041 to generate a feature value. Specifically, a feature value can be generated by accumulating time-series data that arrives in real time in the memory for a given period and performing a time series analysis of a maximum value, a minimum value, an average value, or a variance value.

The data compressing unit 205 compresses data at any time intervals for each sensor. The data inserting unit 206 stores compressed data in the DAT table 208.

Figure 5A:
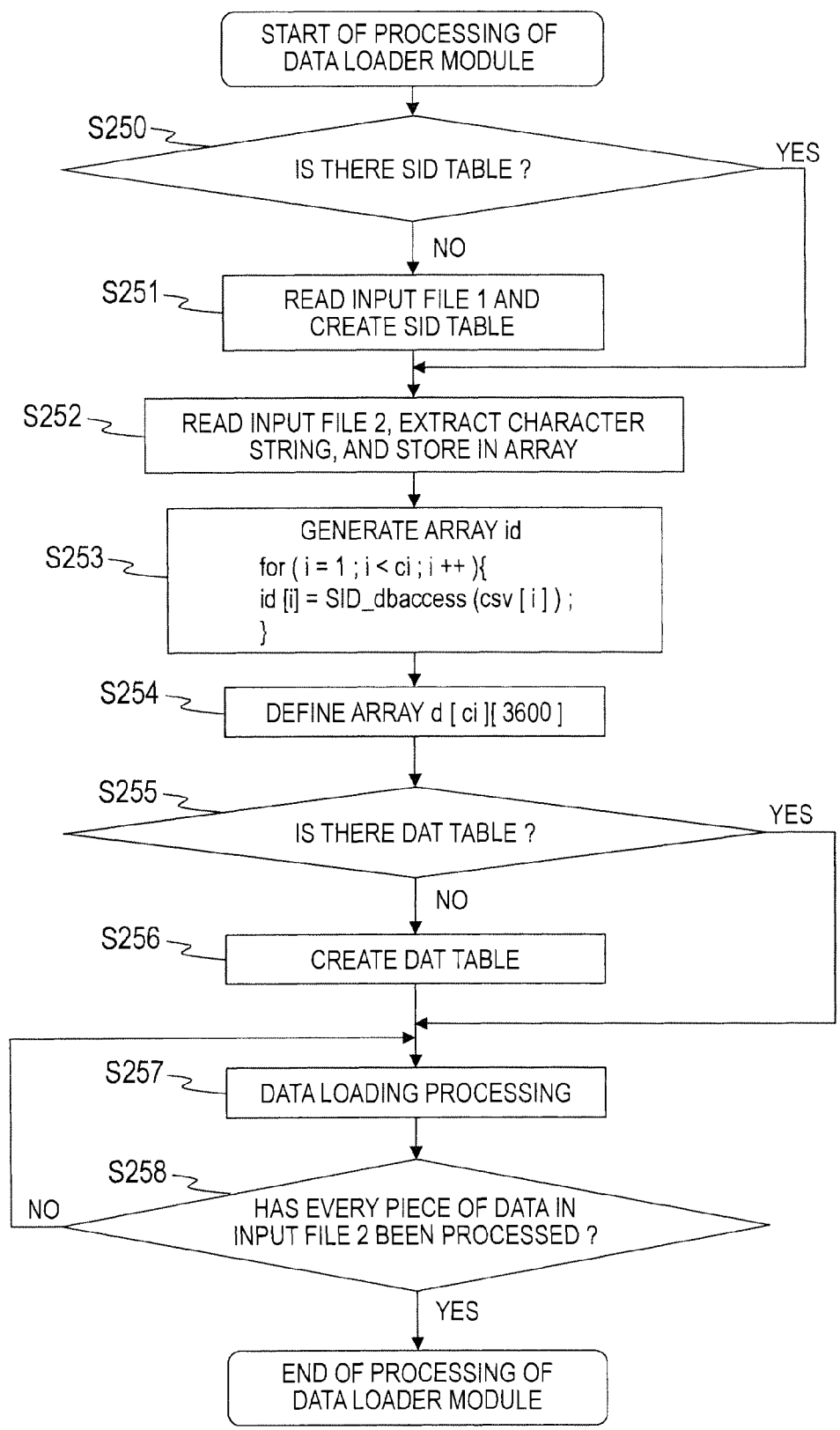
FIG. 5A is a flow chart illustrating processing that is executed by the data loader module in this embodiment.

FIG. 5A is a flow chart illustrating processing that is executed by the data loader module 153 in this embodiment.

The data loader module 153 determines whether or not the SID table 207 is in the database 154 (S250). For example, the data loader module 153 makes a determination by issuing an SQL that is an inquiry about the presence of the SID table 207 to the database 154.

In a case where determined that the SID table 207 is in the database 154, the data loader module 153 proceeds to S252.

In a case where determined that the SID table 207 is not in the database 154, the data loader module 153 reads the input file 1 (151) and creates the SID table 207 (S251).

The data loader module 153 reads one row of character strings out of the input file 2 (152), extracts a character string corresponding to a column from the read character strings which have a comma as a delimiter, and stores in a array csv (S252). For example, in a case where ci character strings are extracted, the extracted character strings are respectively stored in arrays csv[0] to csv[ci−1]. The symbol ci represents the count of columns. In this embodiment, "datetime" is stored in csv[0] and sensor values are stored in csv[1] to csv[ci−1].

The data loader module 153 generates a array id for the search for a value in the ID column 2082 with the use of the sensor name column 1522 of the input file 2 (152) (S253).

The data loader module 153 defines a data sequence for creating compressed data (S254). In this embodiment, where one hour of data of one sensor 100 is compressed, a array d[ci][3600] is defined. This means that 3600 arrays are defined per sensor 100.

The data loader module 153 determines whether or not the DAT table 208 is in the database 154 (S255). For example, the data loader module 153 makes a determination by issuing an SQL that is an inquiry about the presence of the DAT table 208 to the database 154.

In a case where it is determined that the DAT table 208 is in the database 154, the data loader module 153 proceeds to S257.

In a case where it is determined that the DAT table 208 is not in the database 154, the data loader module 153 creates the DAT table 208 (S256).

The data loader module 153 executes data loading processing in which compressed data is generated from the array obtained in S254 and is stored in the DAT table 208 (S257). Details of the data loading processing are described later with reference to FIG. 5B.

The data loader module 153 determines whether or not every piece of data in the input file 2 (152) has been processed (S258).

In a case where determined that not every piece of data in the input file 2 (152) has been processed, the data loader module 153 returns to S257 to execute the same processing.

In a case where determined that every piece of data in the input file 2 (152) has been processed, the data loader module 153 ends the processing.

Figure 5B:
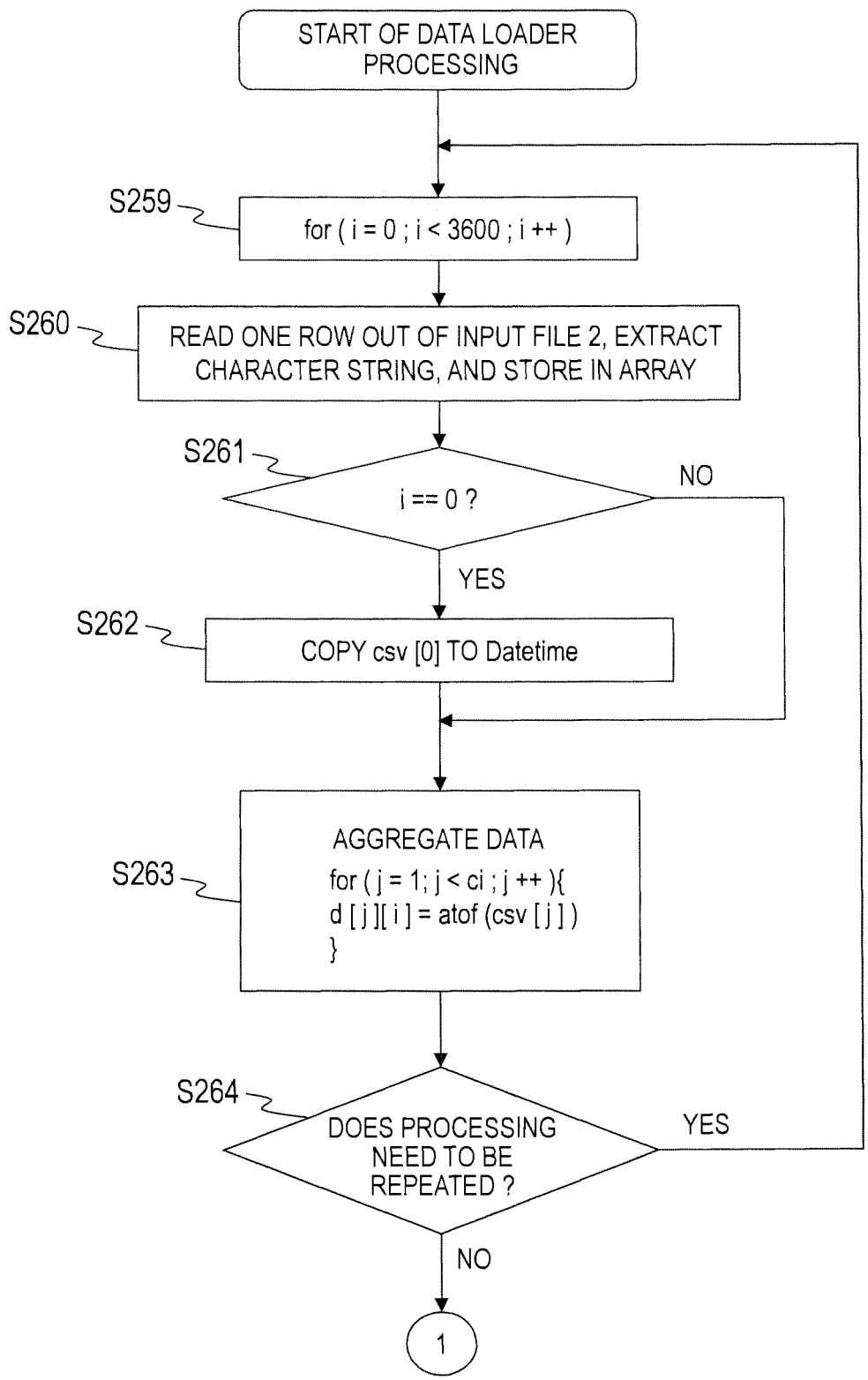
FIGS. 5B and 5C are flow charts illustrating a data loading processing which is executed by the data loader module in this embodiment.
Figure 5C:
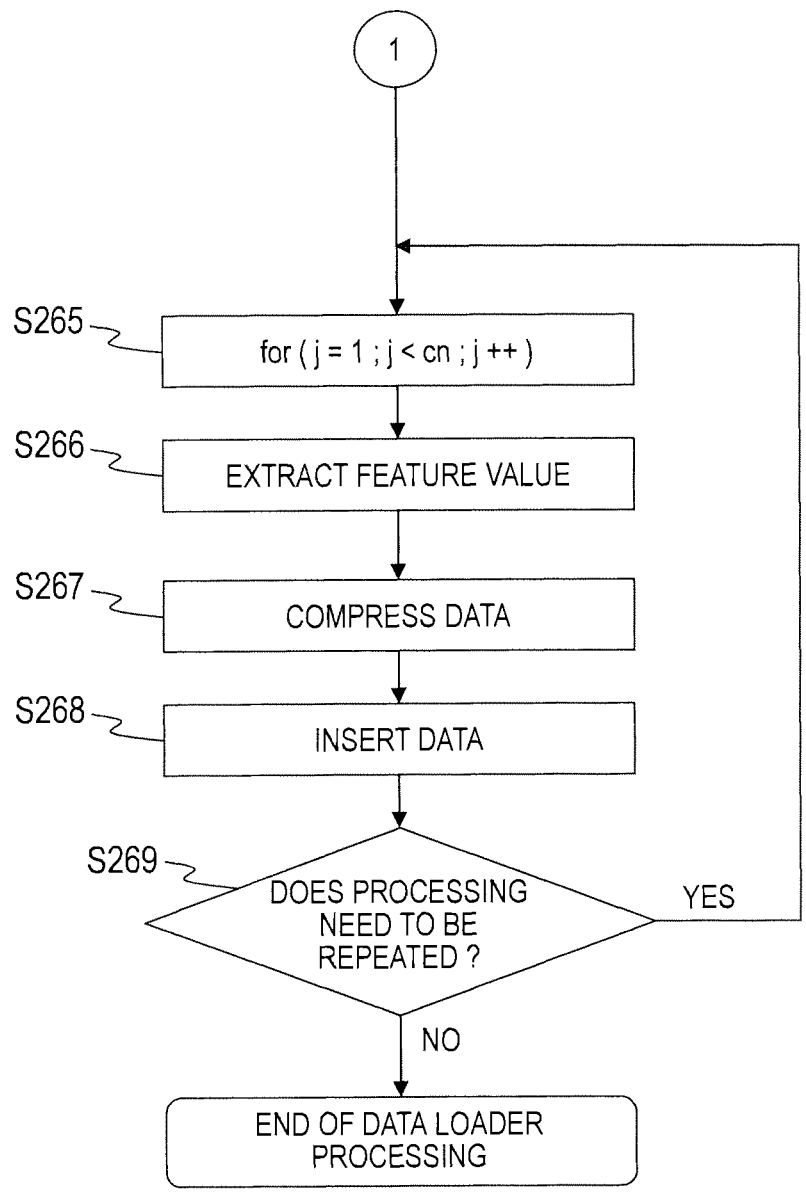

FIGS. 5B and 5C are flow charts illustrating the data loading processing which is executed by the data loader module 153 in this embodiment.

The data loader module 153 initializes a variable i which indicates time (in seconds) and executes the processing for every time value (measured in seconds) (S259). Specifically, the data loader module 153 sets the variable i to "0" and repeatedly executes the processing until the variable i exceeds "3600". Data to be processed in this embodiment is data at 0 seconds to data at 3599 seconds.

The data loader module 153 reads one row of data out of the input file 2 (152), extracts ci character strings from the read data, and stores in the arrays csv[0] to csv[ci−1] (S260).

The data loader module 153 determines whether or not the variable i is "0" (S261).

In a case where it is determined that the variable i is not "0", the data loader module 153 proceeds to S263.

In a case where it is determined that the variable i is "0", the data loader module 153 stores csv[0] in the Datetime column 2081 of the DAT table 208 (S262).

The data loader module 153 aggregates data for each sensor 100 (S263). Specifically, the data aggregating unit 203 digitalizes values stored in the arrays csv and sets the digitalized values to the array d.

The data loader module 153 determines whether to repeat the processing, namely, whether or not the processing has been finished for every time value (S264).

In a case where it is determined that the processing has not been finished for every variable i, the data loader module 153 returns to S259 to execute S260 to S263 after adding "1" to the variable i.

In a case where it is determined that the processing has been finished for every variable i, the data loader module 153 initializes a variable j which indicates the count of the processed sensors 100 and executes the processing for every sensor 100 (S265). Specifically, the data loader module 153 sets the variable j to "1" and executes the processing repeatedly until the variable j exceeds cn.

The data loader module 153 extracts a feature value from the array d[j][i] (S266). Specifically, the feature value extracting unit 204 extracts one of a maximum value, a minimum value, an average value, a variance value, and a specific value in the frequency spectrum, or a combination of those values, from a array d[j][0] to a array d[j][3599].

The data loader module 153 compresses the array d[j][i] in any format (S267). Specifically, the data compressing unit 205 compresses the array d[j][0] to the array d[j][3599] in any format. The compression format can be zip, lzh, gzip, bzip2, and the like.

The data loader module 153 stores the compressed data in the DAT table 208 (S268). Specifically, the data inserting unit 206 stores id[i] generated in S253 in the ID column 2082, stores csv[0] set in S262 in the Datetime column 2081, stores the maximum value extracted in S266 in the MaxVal column 2084 of the DAT table 208, stores the minimum value extracted in S266 in the MinVal column 2085, and stores the data compressed in S267 in the CDATA column 2083.

The data loader module 153 determines whether or not every sensor 100 has been processed (S269).

In a case where it is determined that not every sensor 100 has been processed, the data loader module 153 returns to S266 to execute the same processing.

In a case where it is determined that every sensor 100 has been processed, the data loader module 153 ends the processing.

Figure 6:
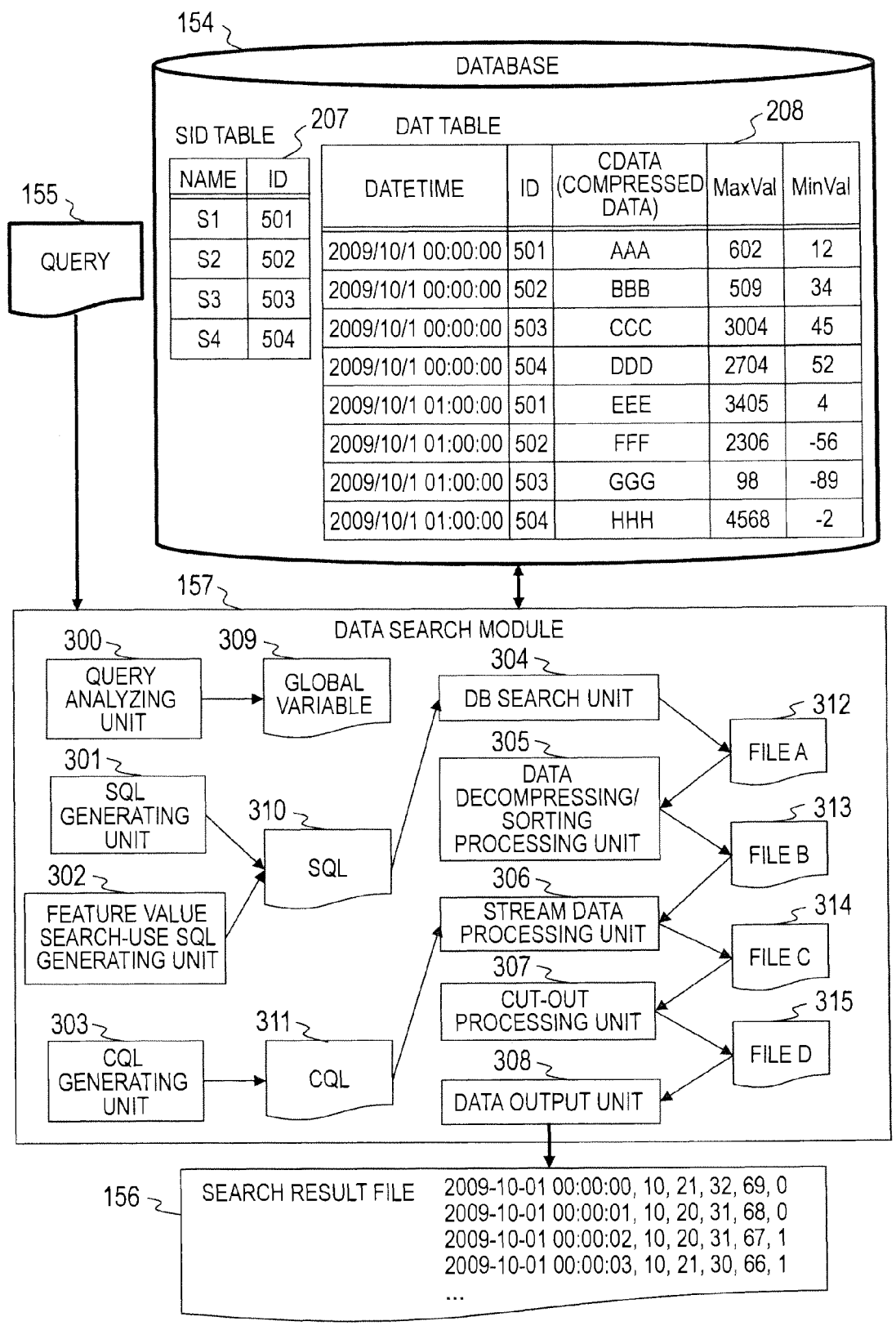
FIG. 6 is a block diagram illustrating a data search module in this embodiment.

FIG. 6 is a block diagram illustrating the data search module 157 in this embodiment.

The data search module 157 issues an SQL to the database 154 based on the input query 155, generates a search result based on a response to the issued SQL, and outputs the generated search result to the search result file 156.

The data search module 157 includes a query analyzing unit 300, an SQL generating unit 301, a feature value search-use SQL generating unit 302, a CQL generating unit 303, a DB search unit 304, a data decompressing/sorting processing unit 305, a stream data processing unit 306, a cut-out processing unit 307, and a data output unit 308.

The query analyzing unit 300 analyzes the input query 155 and outputs the contents of the query 155 as a global variable 309. The global variable 309 is stored in a storage area of the memory 122 or the like, and can be referred to by the SQL generating unit 301, the feature value search-use SQL generating unit 302, the CQL generating unit 303, the DB search unit 304, the data decompressing/sorting processing unit 305, the stream data processing unit 306, the cut-out processing unit 307, and the data output unit 308.

The SQL generating unit 301 generates an SQL 310 for searching the database 154 by using the feature vale based on the global variable 309, which is the result of an analysis by the query analyzing unit 300, and outputs the generated SQL 310 to the DB search unit 304.

The feature value search-use SQL generating unit 302 generates the SQL 310 for searching the database 154 with the use of a feature value based on the global variable 309, which is the result of the analysis by the query analyzing unit 300, and outputs the generated SQL 310 to the DB search unit 304.

The CQL generating unit 303 generates a CQL 311 for executing stream data processing based on the global variable 309, which is the result of the analysis by the query analyzing unit 300, and outputs the generated CQL 311 to the stream data processing unit 306.

The DB search unit 304 issues to the database 154 the SQL 310 generated by the SQL generating unit 301 or the feature value search-use SQL generating unit 302. The DB search unit 304 outputs a result of executing the SQL 310, namely, a data search result, to a file A 312. The data output to the file A 312 is compressed data.

The data decompressing/sorting processing unit 305 reads the file A 312 to decompress the compressed data and sort the decompressed data based on a given condition. The data decompressing/sorting unit 305 outputs the processed data to a file B 313.

The stream data processing unit 306 reads the file B 313 as input data and executes stream data processing for each piece of read data, based on the CQL 311, which has been generated by the CQL generating unit 303. The stream data processing unit 306 outputs the processed data to a file C 314.

The cut-out processing unit 307 extracts data that matches a given condition from the file C 314. The cut-out processing unit 307 outputs the extracted data to a file D 315.

The data output unit 308 generates an output result with the use of data stored in the file D 315, and outputs the generated output result as the search result file 156.

Figure 7:
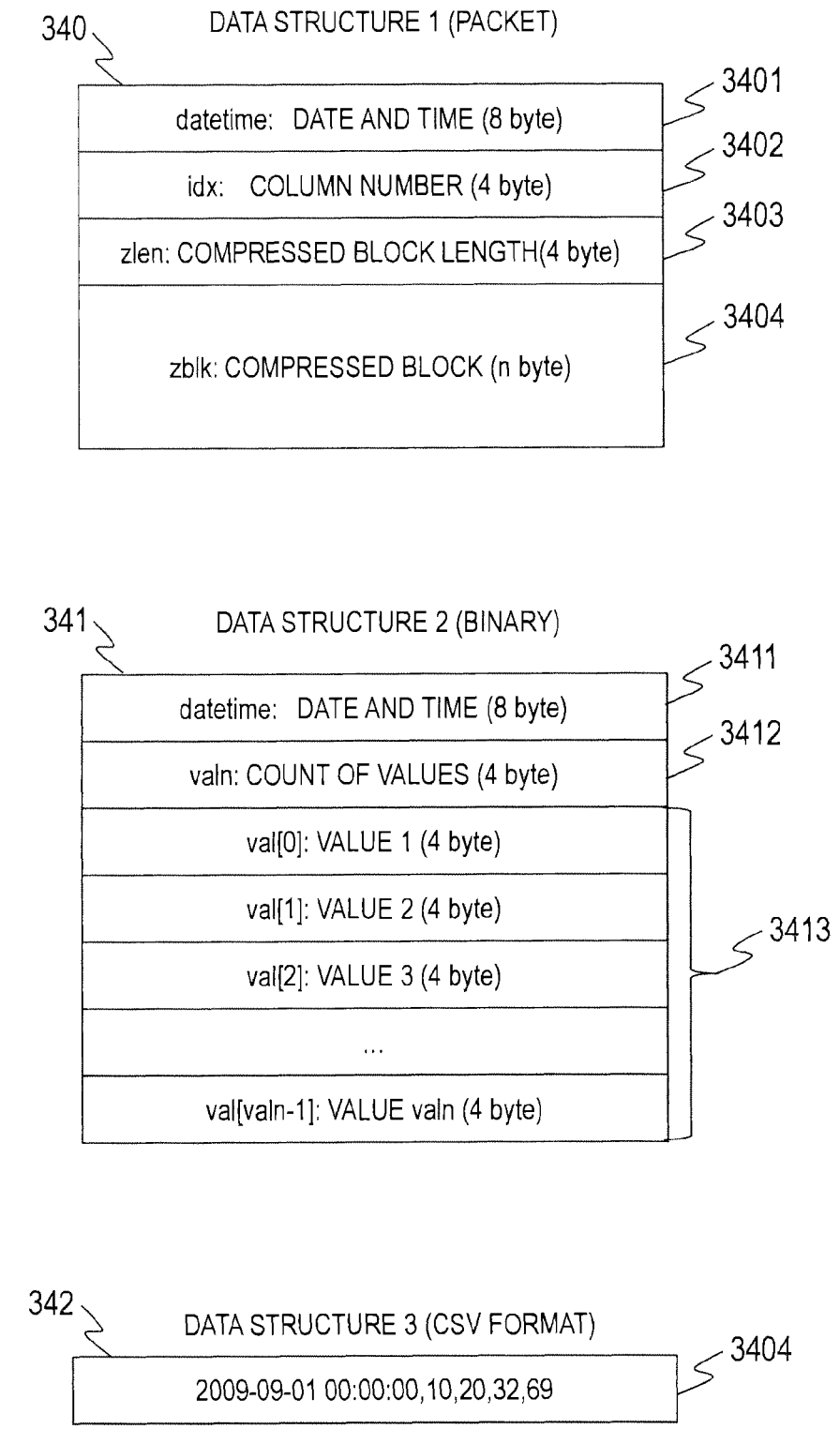
FIG. 7 is an explanatory diagram illustrating an example of data structures of data output by the data search module in this embodiment.

FIG. 7 is an explanatory diagram illustrating an example of data structures of data output by the data search module 157 in this embodiment.

A data structure 1 (340) is the data structure of data (a packet) stored in the file A 312. The file A 312 stores a plurality of packets.

The data structure 1 (340) is constituted of fields for datetime 3401, idx 3402, zlen 3403, and zblk 3404.

The field for datetime 3401 shows time in the form of, for example, a date and a time, and corresponds to the Datetime column 2081 of the DAT table 208. The data length of datetime 3401 in this embodiment is 8 bytes.

The field for idx 3402 shows a sensor identification number for identifying the relevant sensor 100. A sensor identification number assigned to a sensor is the sensor's place in a sensor arrangement order that is written in an input_item phrase of the query example 1. The data length of idx 3402 in this embodiment is 4 bytes.

The field for zlen 3403 shows the block length of compressed data, and the data length of zlen 3403 in this embodiment is 4 bytes.

The field for zblk 3404 shows compressed data, specifically, the compressed data itself. The data length of zblk 3404 in this embodiment is n bytes.

A data structure 2 (341) is the data structure of data (binary) stored in the file B 313, the file C 314, and the file D 315.

A field for datetime 3411 shows time in the form of, for example, a date and a time. The data length of datetime 3411 in this embodiment is 8 bytes.

A field for valn 3412 shows the count of pieces of data 3413, and the data length of valn 3412 in this embodiment is 8 bytes.

Fields for the data 3413 show values calculated by the data decompressing/sorting processing unit 305, the stream data processing unit 306, and the cut-out processing unit 307. The data length of each field for the data 3413 is 4 bytes.

For example, in a case of data "2009/10/1 00:00:00, 4, 100, 300, 12, 52", the field for datetime 3411 stores "2009/10/1 00:00:00", the field for valn 3412 stores "4", the field for valn[0] stores "100", the field for valn[1] stores "300", the field for valn[2] stores "12", and the field for valn[3] stores "52".

A data structure 3 (342) is the data structure of data stored in the search result file 156.

The data structure 3 (342) stores time in the form of, for example, a date and a time, and a value of the relevant sensor 100.

FIGS. 8A and 8B are explanatory diagrams illustrating an example of the query 155, the SQL 310, and the CQL 311 in this embodiment.

The query example 1 (350) and a query example 2 (351) are each an example of the query 155.

The query example 1 (350) is of the query 155 that is issued in a case where stream data processing is executed. The query example 1 (350) shows that the data that matches conditions specified in the where_timerange phrase and the where_condition phrase is extracted from data of the sensors 100 whose sensor names are "Sensor1" and "Sensor2" to be stored in "result.csv".

The query example 2 (351) is of the query 155 that is issued in a case where the stream data processing is not executed. The query example 2 (351) shows that the data at a time interval specified in the where_timerange phrase is extracted from data of the sensors 100 whose sensor names are "Sensor1", "Sensor2", and "Sensor3" to be stored in "result.csv".

An SQL example 1 (352) is an example of the SQL 310 that is generated by the SQL generating unit 301 when a query of the query example 1 (350) is input. How the SQL 310 is generated is described later with reference to FIGS. 11A and 11B.

A CQL example 1 (353) is an example of the CQL 311 that is generated by the CQL generating unit 303 when the query of the query example 1 (350) is input. How the CQL 311 is generated is described later with reference to FIGS. 12A and 12B.

Figure 9:
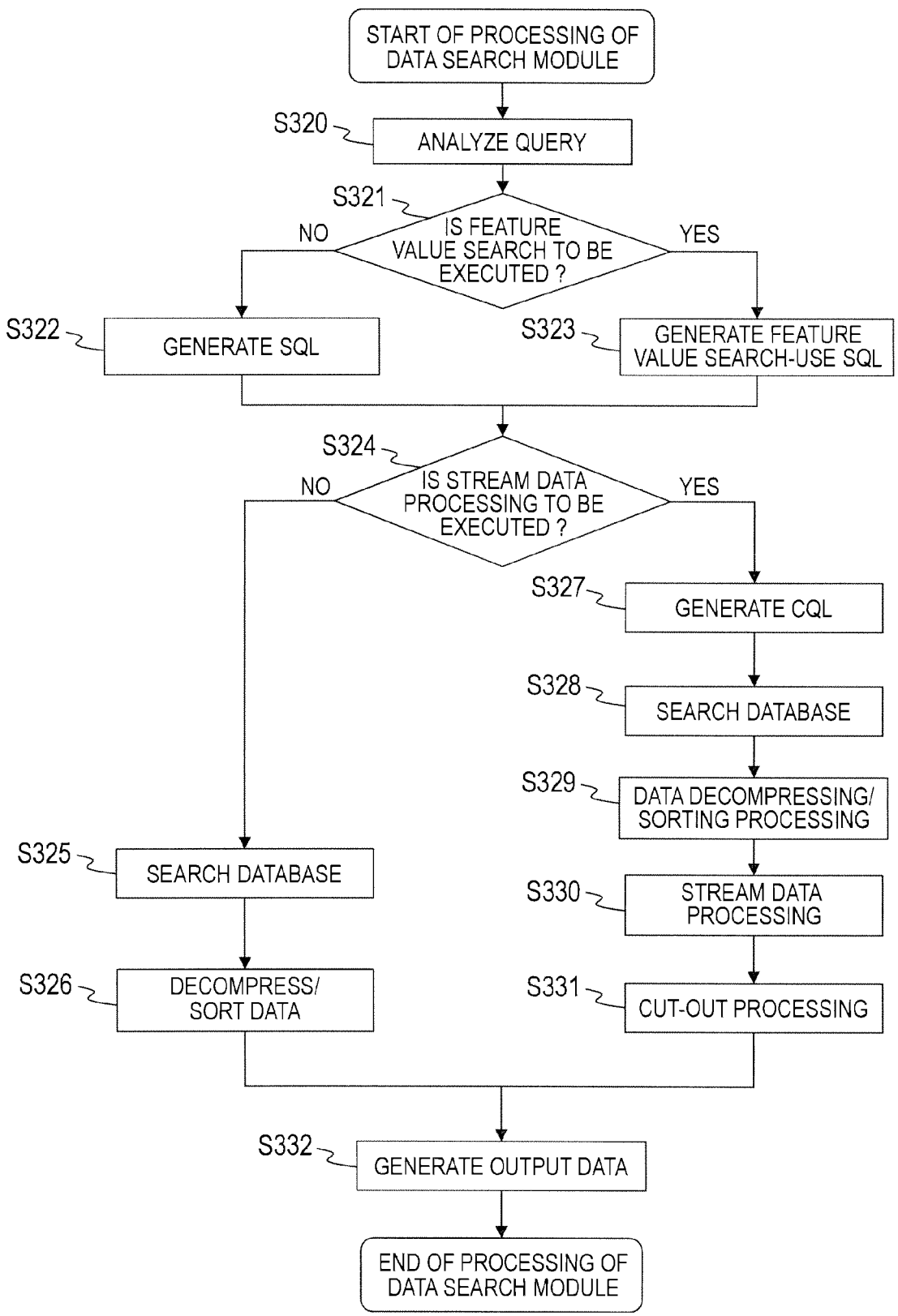
FIG. 9 is a flow chart illustrating an outline of processing that is executed by the data search module of this embodiment.

FIG. 9 is a flow chart illustrating an outline of processing that is executed by the data search module 157 of this embodiment.

The data search module 157 receives an input of the query 155 from one of the data displaying terminals 106 and starts the processing.

The data search module 157 analyzes the input query 155 (S320). Specifically, the query analyzing unit 300 analyzes the input query 155.

The data search module 157 determines whether or not the input query 155 is a query requesting the execution of a feature value search (S321). Specifically, the query analyzing unit 300 determines whether or not the input query 155 includes a meta_search phrase. In a case where a meta_search phrase is included in the input query 155, the input query 155 is determined as the query requesting the execution of a feature value search. An example of the query 155 that includes a meta_search phrase is described later with reference to FIG. 22.

In a case where it is determined that the input query 155 is not the query requesting the execution of a feature value search, the data search module 157 generates the SQL 310 (S322). Specifically, the SQL generating unit 301 generates the SQL 310 and the data search module 157 proceeds to S324.

In a case where it is determined that the input query 155 is the query requesting the execution of a feature value search, the data search module 157 generates the feature value search-use SQL 310 (S323). Specifically, the feature value search-use SQL generating unit 302 generates the feature value search-use SQL 310 and the data search module 157 proceeds to S324.

The data search module 157 next determines whether or not the stream data processing is to be executed (S324). Specifically, the query analyzing unit 300 determines whether or not the input query 155 includes a select_items phrase. In a case where the input query 155 includes a select_items phrase, it is determined that the stream data processing is to be executed.

In a case where it is determined that the stream data processing is not to be executed, the data search module 157 searches the database 154 based on the SQL 310 generated by the SQL generating unit 301 or the feature value search-use SQL generating unit 302 (S325). Specifically, the DB search unit 304 searches the database 154 based on the SQL 310 generated by the SQL generating unit 301 or the feature value search-use SQL generating unit 302, and outputs compressed data that is found as a result of the search to the file A 312.

The data search module 157 decompresses compressed data that is stored in the file A 312, and sorts the decompressed data (S326). Specifically, the data decompressing/sorting processing unit 305 decompresses compressed data that has been stored in the file A, sorts the decompressed data, and outputs to the file B. The data search module 157 then proceeds to S332.

In a case where it is determined in S324 that the stream data processing is to be executed, the data search module 157 generates the CQL 311 (S327). Specifically, the CQL generating unit 303 generates the CQL 311.

The data search module 157 searches the database 154 based on the SQL 310 generated by the SQL generating unit 301 or the feature value search-use SQL generating unit 302 (S328).

The data search module 157 decompresses compressed data that has been stored in the file A 312, and sorts the decompressed data (S329). This step is the same as S326.

The data search module 157 executes the stream data processing based on the CQL 311 generated by the CQL generating unit 303 (S330). Specifically, the stream data processing unit 306 executes the stream data processing based on the CQL 311 generated by the CQL generating unit 303, and outputs a result of the execution to the file C 314.

The data search module 157 cuts out data to be output from data stored in the file C 314 (S331). Specifically, the cut-out processing unit 307 cuts out data to be output from data stored in the file C 314 and outputs the cut out data to the file D 315. The data search module 157 then proceeds to S332.

The data search module 157 converts data stored in the file B or the file D 315 into output data which is to be displayed on the data displaying terminal 106 and outputs to the search result file 156 (S332), and then ends the processing.

Details of the respective steps are described below.

Figures 10A, 10B:
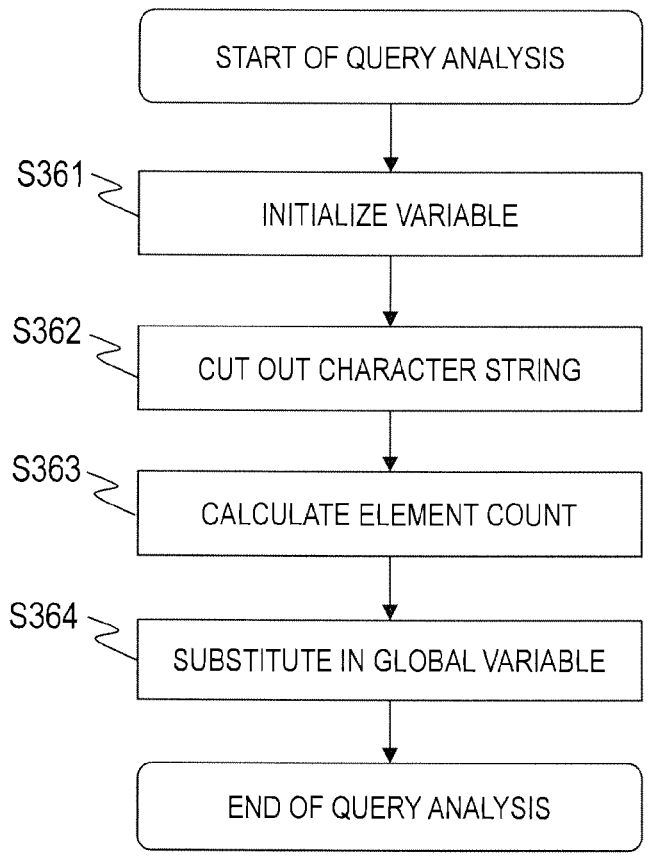
FIG. 10A is an explanatory diagram illustrating character strings that are cut out by a query analyzing unit in this embodiment.
FIG. 10B is a flow chart illustrating an example of a query analyzing processing that is executed by the query analyzing unit of this embodiment.

FIG. 10A is an explanatory diagram illustrating character strings that are cut out by the query analyzing unit 300 in this embodiment.

A character cut-out portion 360 shows character strings cut out of the input query 155. The query analyzing unit 300 holds the character cut-out portion 360 which is a template specifying keywords to be cut out.

In the example of FIG. 10A, variables "$input", "$range", "$select", "$start", "$end", "$cond", "$prev", "$post", "$step", "$file", and "$meta" are cut out of nine keywords. The keywords as used herein refer to "input_item:", "select_items", and the like.

For example, a character string following the keyword "input_items:" is cut out of the input query 155 to be stored in the variable "$input".

The query analyzing processing executed by the query analyzing unit 300 is described below.

FIG. 10B is a flow chart illustrating an example of the query analyzing processing that is executed by the query analyzing unit 300 of this embodiment.

The query analyzing unit 300 receives an input of the query 155 and starts the processing.

The query analyzing unit 300 first initializes the variables (S361). Specifically, the query analyzing unit 300 sets "1" to "$range", "$cond", and "$step" and sets "0" to "$prev" and "$post". The query analyzing unit 300 also executes null initialization for "$input", "$select", "$start", "$end", "$file", and "$meta".

The query analyzing unit 300 next cuts character strings out of the input query 155 based on the character cut-out portion 360, and stores the cut out character strings in the respective variables (S362).

Specifically, the query analyzing unit 300 cuts character strings out of nine phrases included in the query 155, and respectively stores the cut out character strings in the variables "$input", "$range", "$select", "$start", "$end", "$cond", "$prev", "$post", "$step", "$file", and "$meta".

For example, in a case of the query example 1 (350), "'Sensor1', 'Sensor2'" is stored in the variable "$input".

For keywords that are not included in the query 155, the values set in S361 are used as they are.

The query analyzing unit 300 calculates the count of elements included in the variable "$input" and the count of elements included in "$select" (S363).

Specifically, the query analyzing unit 300 calculates the element count for each of the variables "$input" and "$select" by counting elements which are separated from one another by a comma (",") in a character string included in the variable. The query analyzing unit 300 substitutes the count of elements included in the variable "$input" in a variable "$inum", and stores the count of elements included in the variable "$select" in a variable "$snum".

For example, in a case where "'Sensor1', 'Sensor2'" is stored in the variable "$input", "2" is stored in "$inum".

The query analyzing unit 300 outputs each variable as the global variable 309 (S364) and ends the processing.

Figures 11A, 11B:
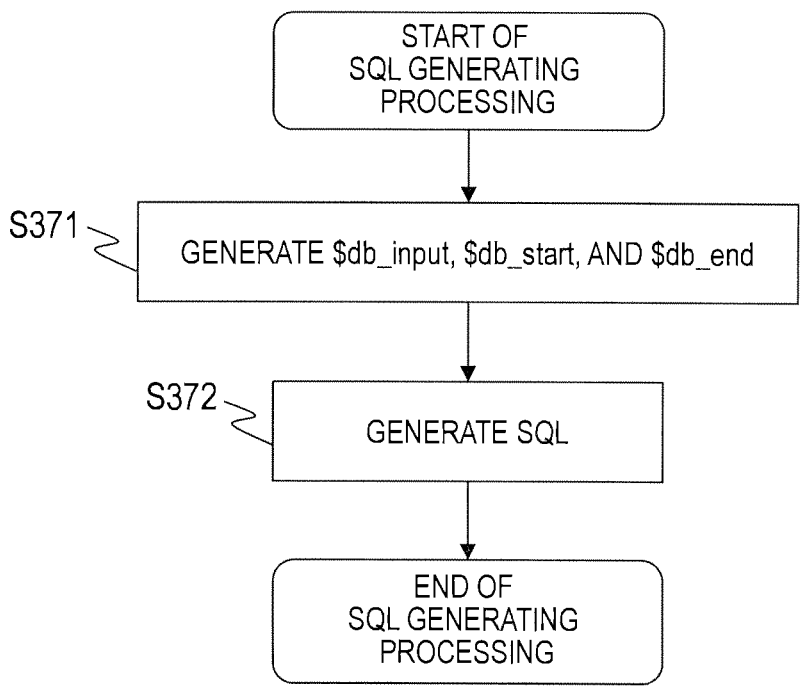
FIG. 11A is an explanatory diagram illustrating an SQL template for generating the SQL in this embodiment.
FIG. 11B is a flow chart illustrating an example of processing that is executed by an SQL generating unit of this embodiment.

FIG. 11A is an explanatory diagram illustrating an SQL template for generating the SQL 310 in this embodiment.

An SQL template 370 is a template for generating the SQL 310, and is had by the SQL generating unit 301.

The template in the example of FIG. 11A is of an SQL for a search of a table that is obtained by equi-joining (a join operation) the SID table 207 and the DAT table 208 with the use of values in the ID column 2072 of the SID table 207 and the ID column 2082 of the DAT table 208, for a time (Datetime), a sensor name (SID, Name), and compressed data (DAT, CDAT) based on a given condition. The given condition is defined in a part that follows the where phrase. In other words, the SQL defined by the template is for sorting data chronologically and obtaining data that matches a specified sensor name and a specified time section.

The SQL generating unit 301 generates the SQL 310 by substituting necessary data in underlined parts of the SQL template 370 which hold bold characters with the use of the global variable 309. Specifically, the SQL generating unit 301 generates "$db_input", "$db_start", and "$db_end", and substitutes the generated data in the SQL template 370.

SQL generating processing is described below.

FIG. 11B is a flow chart illustrating an example of processing that is executed by the SQL generating unit 301 of this embodiment.

The SQL generating unit 301 generates "$db_input", "$db_start", and "$db_end", by using the global variable 309 (S371).

Specifically, "$db_input" and "$db_end" are generated so that "$db_input" and "$db_end" are equal to "$input" and "$end", respectively. The data "$db_start" is obtained by calculating "$db_start=$start-$range", and initializing the minute value and second value of the result of this calculation to "0". This is because data searched for in this embodiment is compressed data of one hour of data.

The SQL generating unit 301 next generates the SQL 310 (S372) and ends the processing.

Specifically, the SQL generating unit 301 generates the SQL 310 by substituting the generated data "$db_input", "$db_start", and "$db_end" in the SQL template 370.

FIG. 12A is an explanatory diagram illustrating a CQL template for generating the CQL 311 in this embodiment.

A CQL template 380 is a template for generating the CQL 311, and is kept by the CQL generating unit 301. The CQL generating unit 303 generates the CQL 311 by substituting necessary data in underlined parts of the CQL template 380 which hold bold characters with the use of the global variable 309.

Specifically, the CQL generating unit 303 generates "$cql_input", "$cql_select", "$range", "$cql_label", and "$cond", and substitutes the generated data in the CQL template 380.

CQL generating processing is described below.

Figure 12B:
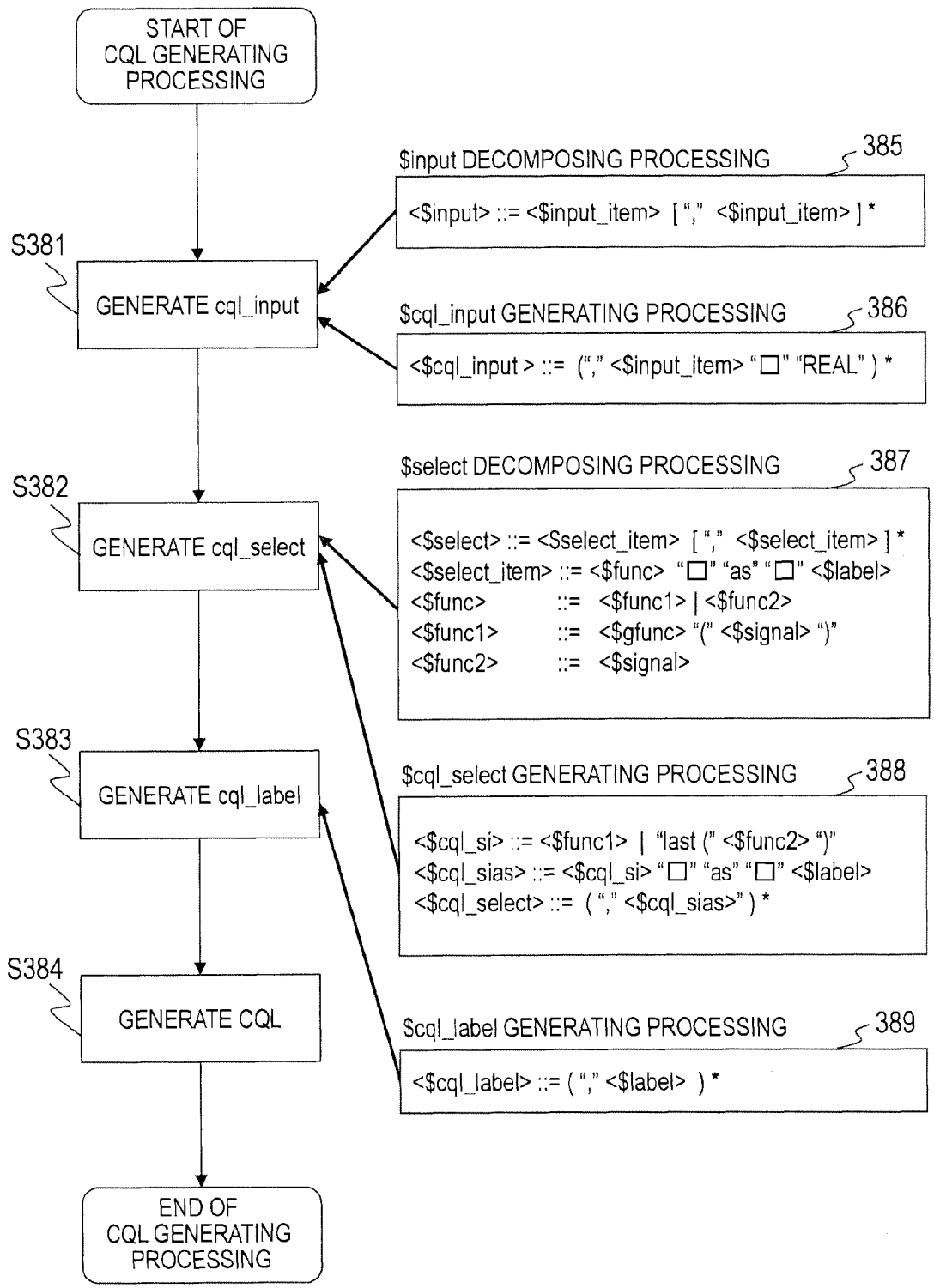
FIG. 12B is a flow chart illustrating processing that is executed by a CQL generating unit of this embodiment.

FIG. 12B is a flow chart illustrating processing that is executed by the CQL generating unit 303 of this embodiment.

The CQL generating unit 303 generates "$cql_input", by using the global variable 309 (S381). Specifically, the following two types of processing are executed.

The CQL generating unit 303 first executes $input decomposing processing 385 with the use of "$input" included in the global variable 309. In other words, the CQL generating unit 303 decomposes "$input" into a plurality of elements "$input item". This is processing for obtaining individual sensor names from "$input" which includes a plurality of sensor names.

The CQL generating unit 303 next executes $cql_input generating processing 386 with the use of "$input_item". The CQL generating unit 303 uses "$input_item" to generate "$cql_input" in a manner indicated by the right side of the $cql_input generating processing 386.

The CQL generating unit 303 generates "$cql_select", by using the global variable 309 (S382). Specifically, the following two types of processing are executed.

The CQL generating unit 303 first executes $select decomposing processing 387 with the use of "$select" included in the global variable 309. This is processing for decomposing $select" into elements. The CQL generating unit 303 obtains "$func1" or "$func2" and "$label" by executing the $select decomposing processing 387.

The CQL generating unit 303 next executes $cql_select generating processing 388 with the use of "$func1" or "$func2" and "$label" to generate "$cql_select". The element "$func1" is an aggregate function that can describe a moving average (avg) value, a variance value, a maximum value, a minimum value, or the like.

In CQL, an aggregate function of avg or the like and a signal name such as "Sensor1" cannot be handled together in a mixed manner. It is therefore necessary to convert an element included in "$select" into an aggregate function with the use of a last ( ) function. For example, a character string "'Sensor1' as LABEL" is converted into an aggregate function "last('Sensor1') as LABEL".

The CQL generating unit 303 generates "$cql_label", by using the global variable 309 (S383). Specifically, the CQL generating unit 303 generates "$cql_label" by executing $cql_label generating processing 389 with the use of "$label".

The CQL generating unit 303 substitutes "$cql_input", "$cql_select", and "$cql_label", which have been generated in S381 to S383, and "$range" and "$cond", which are included in the global variable 309, in the CQL template 380, to thereby generate the CQL 311 (S384).

The data search module 157 can thus generate the SQL 310 and the CQL 311 simultaneously based on the input query 155.

Processing that uses the generated SQL 310 and CQL 311 is described below.

Figure 13:
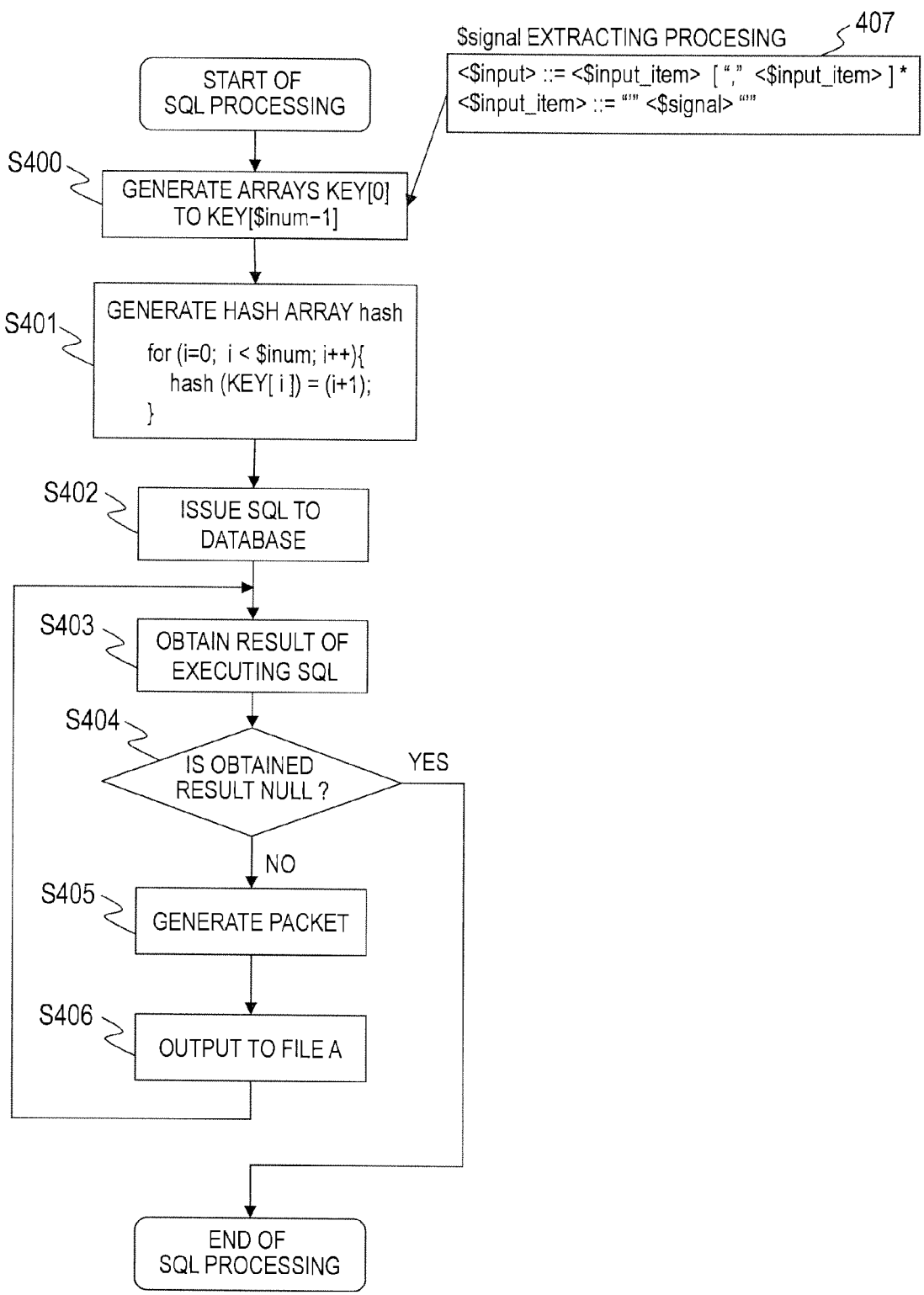
FIG. 13 is a flow chart illustrating an example of SQL processing that is executed by a DB search unit of this embodiment.

FIG. 13 is a flow chart illustrating an example of SQL processing that is executed by the DB search unit of this embodiment.

The DB search unit 304 generates arrays KEY[0] to KEY ["$inum_−1] with the use of "$input" included in the global variable 309 (S400).

Specifically, the DB search unit 304 executes $signal extracting processing 407 by using "$input". As a result, "$inum" pieces of "$signal" are extracted. The DB search unit 304 stores the extracted pieces of "$signal" respectively in the arrays KEY[0] to KEY[$inum−1]. The arrays KEY[0] to KEY[$inum−1] are generated through the processing described above.

The DB search unit 304 generates a hash array "hash" with the use of the generated arrays KEY[0] to KEY[$inum−1] (S401).

The DB search unit 304 issues the SQL 310 to the database 154, which then executes the SQL 310 (S402). Data that matches a condition specified in the issued SQL 310 can be obtained as an execution result in this manner.

The DB search unit 304 takes one row of data out of the obtained execution result and obtains, from the taken out data, time (Datetime) in the form of, for example, a date and a time, a sensor name (Name), and compressed data (CDATA) (S403). The one row of taken out data is data obtained by compressing one hour of data of one sensor.

The DB search unit 304 determines whether or not the one row of data taken out of the execution result is null (S404). In other words, the DB search unit 304 determines whether or not every execution result has been processed.

In a case where it is determined that the one row of data taken out of the execution result is null, the DB search unit 304 ends the processing.

In a case where it is determined that the one row of data taken out of the execution result is not null, the DB search unit 304 generates a packet that has the data structure 1 (340) (S405).

Specifically, the DB search unit 304 stores, as datetime 3401, time (Datetime) that is included in the one row of taken out data in the form of, for example, a date and a time, stores, as idx 3402, a value obtained from the hash array "hash" with the sensor name (Name) as a key, stores the compressed data (CDATA) as zblk 3404, and stores the size of the compressed data (CDATA) as zlen 3403.

The DB search unit 304 outputs the generated packet to the file A 312 (S406), and returns to S403 to execute S403 to S406.

For example, in a case where the SQL of the SQL example 1 (352) is executed, data from "2009-02-01 23:00:00" to "2009-02-20 23:59:59" is obtained from the sensors 100 whose sensor names are "'Sensor1'" and "'Sensor2'" to be converted into a plurality of packets having the data structure 1 (340), and the packets are output to the file A 312.

Figure 14A:
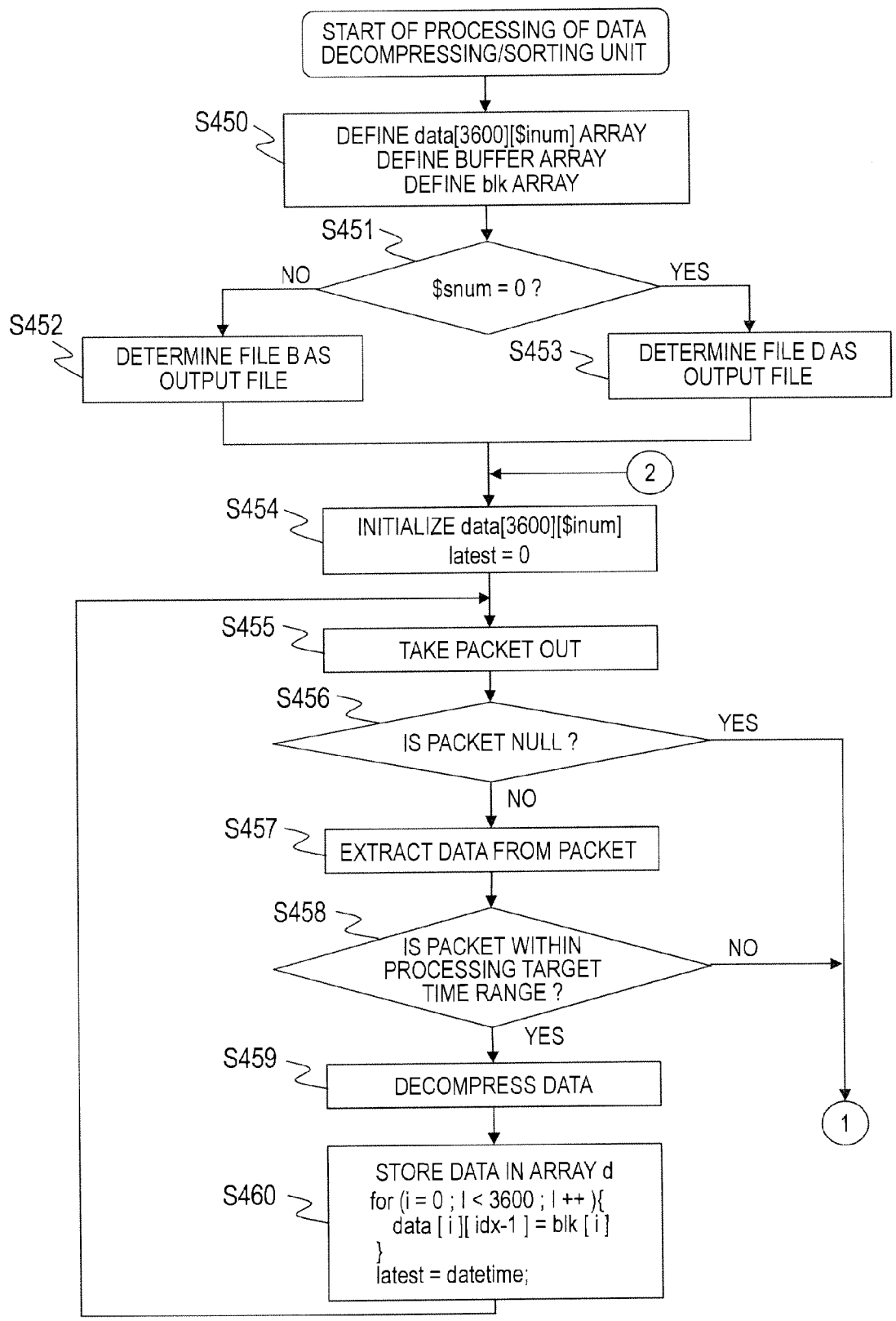
FIGS. 14A and 14B are flow charts illustrating an example of processing that is executed by a data decompressing/sorting processing unit of this embodiment.
Figure 14B:
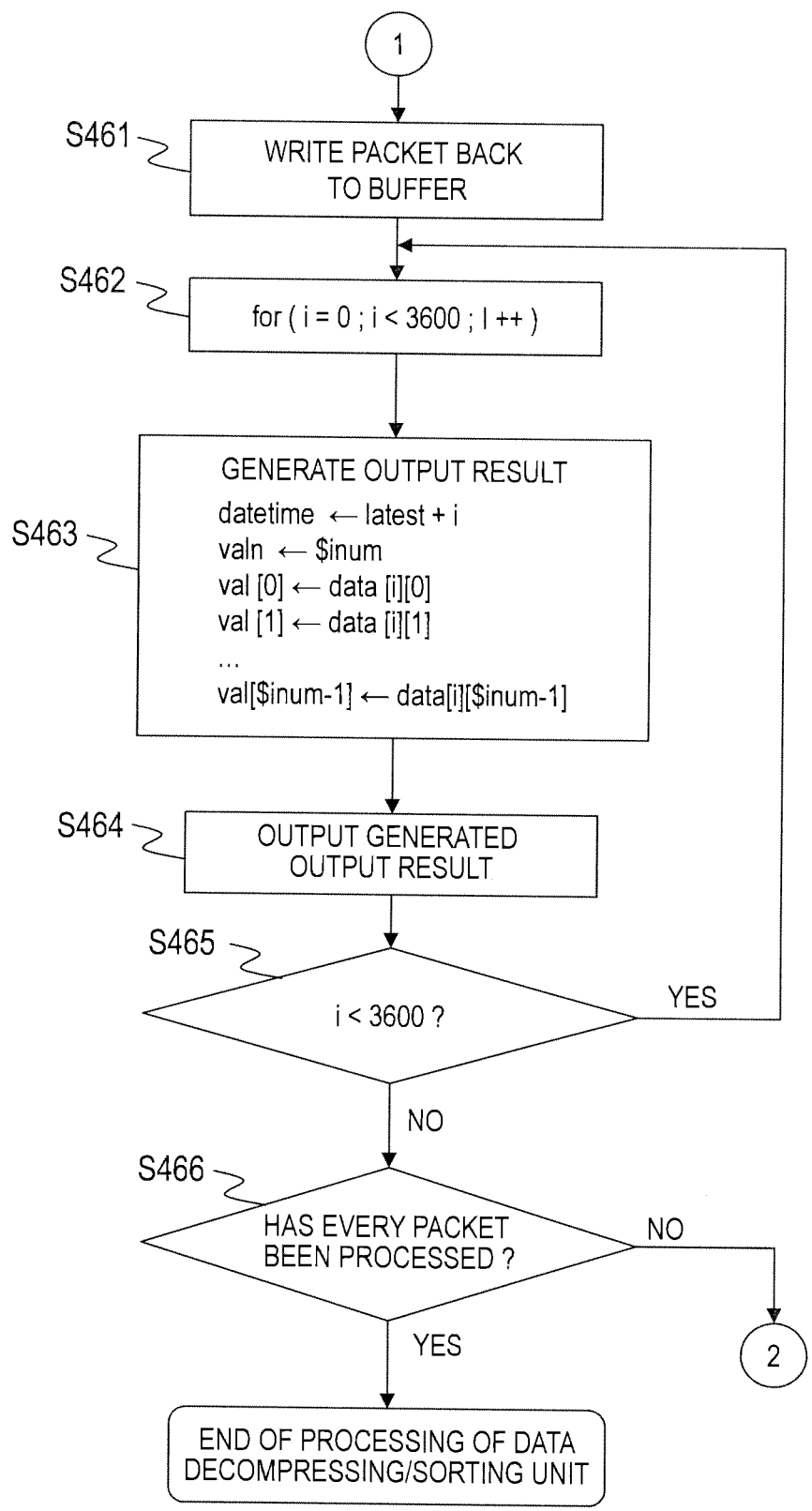

FIGS. 14A and 14B are flow charts illustrating an example of processing that is executed by the data decompressing/sorting processing unit 305 of this embodiment.

The data decompressing/sorting processing unit 305 defines a data[3600][$inum] array, a buffer array, and a blk array (S450). The data[3600][$inum] array is defined because one piece of compressed data stores one hour of data, i.e., 3600 pieces of data, of one sensor 100 in this embodiment.

The data decompressing/sorting processing unit 305 determines whether or not "$snum" which is included in the global variable 309 is "0" (S451). This determines whether or not the stream data processing is to be executed. To elaborate, in a case where the query 155 does not include a select_items phrase as in the query example 2 (351) of FIG. 8A, "$snum" is "0" and it is therefore determined that the stream data processing is not to be executed.

In a case where determined that "$snum" is not "0", the data decompressing/sorting processing unit 305 determines the file B 313 as the file to which the result of the processing is output (S452), and proceeds to S434.

In a case where determined that "$snum" is "0", the data decompressing/sorting processing unit 305 determines the file D 315 as the file to which the result of the processing is output (S453), and proceeds to S434.

The data decompressing/sorting processing unit 305 initializes the data[3600][$inum] array and the time (S454). Specifically, the data decompressing/sorting processing unit 305 uses a not-a-number (NaN) value to initialize the data [3600][$inum] array, and initializes a variable latest which indicates time to "0". While this embodiment uses an NaN value for the initialization of the array data, any value that does not overlap with a numerical value can be used.

The data decompressing/sorting processing unit 305 takes out one packet having the data structure 1 (340) (S455). Specifically, the data decompressing/sorting processing unit 305 takes out a packet from a buffer. In a case where no packets are found in the buffer, a packet is taken out of the file A 312. At the time the processing is executed for the first time, the buffer stores no packets and the data decompressing/sorting processing unit 305 therefore takes a packet out of the file A 312.

The data decompressing/sorting processing unit 305 determines whether or not the taken out packet is null (S456). In other words, whether or not the taken out packet includes processing target data is determined.

In a case where determined that the taken out packet is not null, the data decompressing/sorting processing unit 305 extracts data from the packet (S457). Specifically, the data decompressing/sorting processing unit 305 extracts datetime 3401, idx 3402, zlen 3403, and zblk 3404 from the packet.

In order to process time-series data blocks of the same time at once, the data decompressing/sorting processing unit 305 determines whether or not the taken out packet is data within a processing time range (S458). Specifically, latest which holds datetime 3401 of the packet received last time is compared with datetime 3401 of the packet (340) received this time to determine whether or not the packet in question is a packet within one hour, which is the processing time range.

In a case where determined that the taken out packet is data within the processing time range, the data decompressing/sorting processing unit 305 decompresses the compressed data (S459). Specifically, the data decompressing/sorting processing unit 305 decompresses zblk 3404 included in the taken out packet, and stores the result in blk.

The data decompressing/sorting processing unit 305 stores the decompressed data in the array "data" (S460), and returns to S455 to execute S455 to S460. Specifically, the data decompressing/sorting processing unit 305 stores blk in the array "data". The data decompressing/sorting processing unit 305 also stores datetime 3401 in latest.

In a case where it is determined in S456 that the taken out packet is null, or in a case where it is determined in S458 that the taken out packet is not data within the processing time range, the data decompressing/sorting processing unit 305 writes the taken out packet back to the buffer (S461).

The data decompressing/sorting processing unit 305 sets "0" to the variable i which indicates the loop count, and repeatedly executes the processing 463 and the processing 464 for each piece of one hour of data in the packet (S462). In other words, the processing is repeated until the variable i exceeds "3600".

The data decompressing/sorting processing unit 305 generates an output result (S463). To elaborate, the data decompressing/sorting processing unit 305 generates data that has the data structure 2 (341).

Specifically, for the variable i, latest+i is stored as datetime 3411, "$sium" is stored as valn 3412, and the array "data" is stored as the data 3413. An output result corresponding to one second (one row) of data of a sensor specified in the input_items phrase is obtained in this manner. Accordingly, one hour of data of a sensor specified in the input_items phrase is obtained as an output result by repeating the same processing for every variable i.

The data decompressing/sorting processing unit 305 outputs the generated output result to the file B 313 or the file D 315 (S464).

The data decompressing/sorting processing unit 305 determines whether or not a packet for one hour of data has been processed (S465). In other words, whether or not the variable i exceeds "3600" is determined. In a case where the variable i is smaller than "3600", it is determined that the processing of a packet for one hour of data has not been completed.

In a case where it is determined that the processing has not been finished for every variable i, in other words, when the variable i is smaller than "3600", the data decompressing/sorting processing unit 305 returns to S462 to execute S462 to S466.

In a case where it is determined that the processing has been finished for every variable i, in other words, when the variable i exceeds "3600", the data decompressing/sorting processing unit 305 determines whether or not every packet stored in the file A 312 has been processed (S466).

In a case where it is determined that not every packet stored in the file A 312 has been processed, the data decompressing/sorting processing unit 305 returns to S454 to execute S454 to S466.

In a case where it is determined that every packet stored in the file A 312 has been processed, the data decompressing/sorting processing unit 305 ends the processing.

Figure 15:
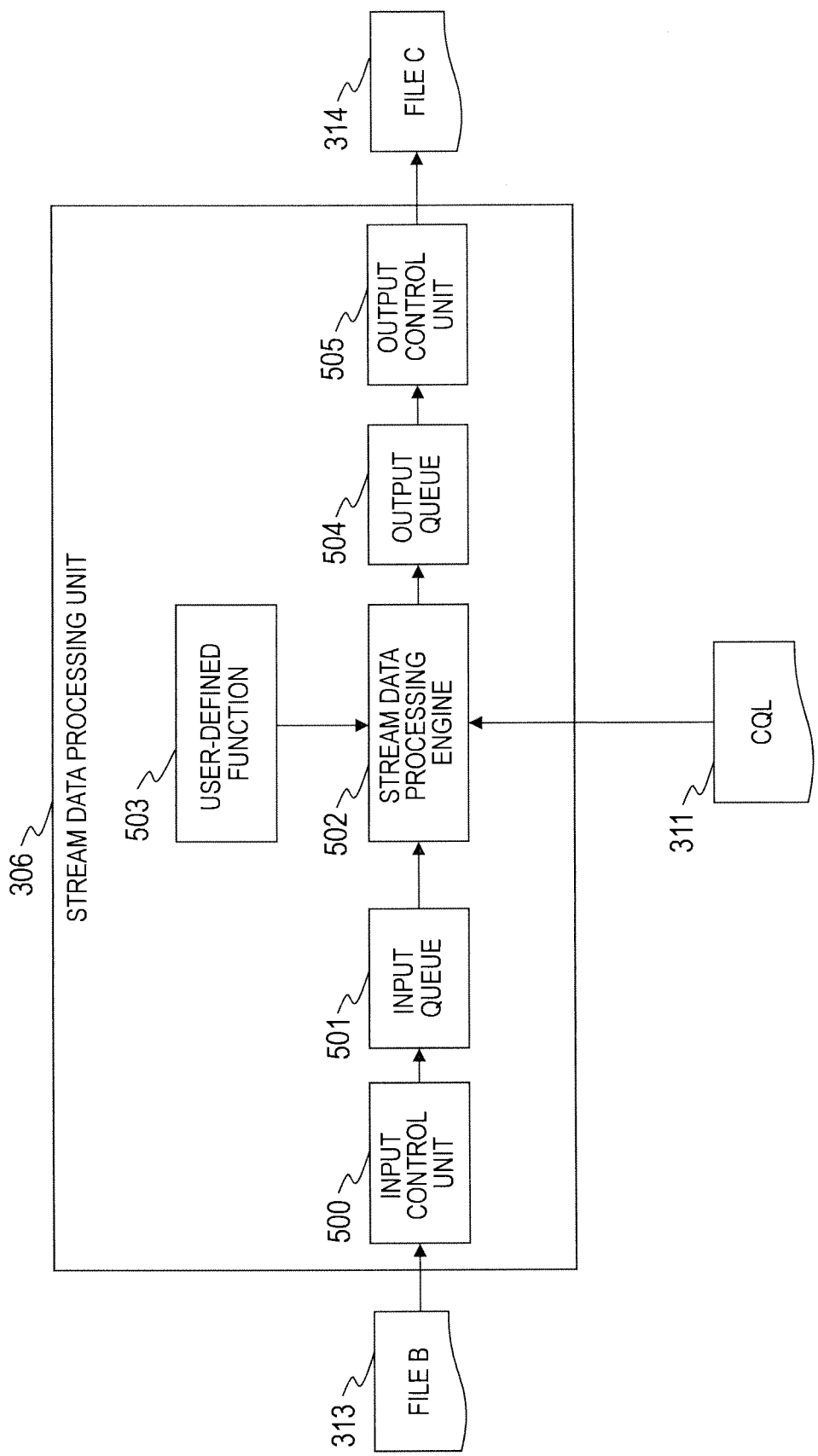
FIG. 15 is an explanatory diagram illustrating a configuration example of a stream data processing unit in this embodiment.

FIG. 15 is an explanatory diagram illustrating a configuration example of the stream data processing unit 306 in this embodiment.

The stream data processing unit 306 includes an input control unit 500, an input queue 501, a stream data processing engine 502, a user-defined function 503, an output queue 503, and an output control unit 505.

The input control unit 500 executes input control. Specifically, the input control unit 500 receives data that is input from the file B 313, and outputs the received data to the input queue 501. The input queue 501 stores data that is input to the input control unit 500.

The stream data processing engine 502 takes data out of the input queue 501, analyzes the taken out information based on the CQL 311, and outputs a result of the analysis to the output queue 504.

The user-defined function 503 stores the definition of a calculation method for a function used in the CQL 311. Details of the user-defined function 503 are described later with reference to FIG. 16.

The output queue 504 stores an analysis result that is input from the stream data processing engine 502.

The output control unit 505 executes output control. Specifically, the output control unit 505 reads an analysis result out of the output queue 504, and outputs the analysis result to the file C.

In this embodiment, data stored in the file B 313 that has "$inum" as valn 3412, namely, data that stores "$inum" values about the relevant sensor 100, is first input from the file B 313 to the stream data processing unit 306. The stream data processing unit 306 outputs, to the file C 314, a result of executing the processing based on the CQL 311.

Specifically, "$snum+1" is stored as valn 3412 of data stored in the file C 314, processing results specified in the select_items phrase of the query 155 are stored as val[0] to val[$snum−1] of the data 3413, and a processing result with respect to a condition specified in the where_condition phrase of the query 155 is stored as val[$snum] of the data 3413.

In a case where the data matches a condition specified in the where_condition phrase, "1" is stored as val[$snum]. In a case where the data does not match a condition specified in the where_condition phrase, "0" is stored as val[$snum]. A value stored as val[$snum] is used by the cut-out processing unit 307, which is described later, as a flag for determining a cut-out range 552 (see FIG. 19).

In this embodiment, where one processing result of the where_condition phrase is added to "$snum" processing results specified in the select_items phrase, the data 3413 of data stored in the file C 314 includes "$snum+1" values.

Figure 16:
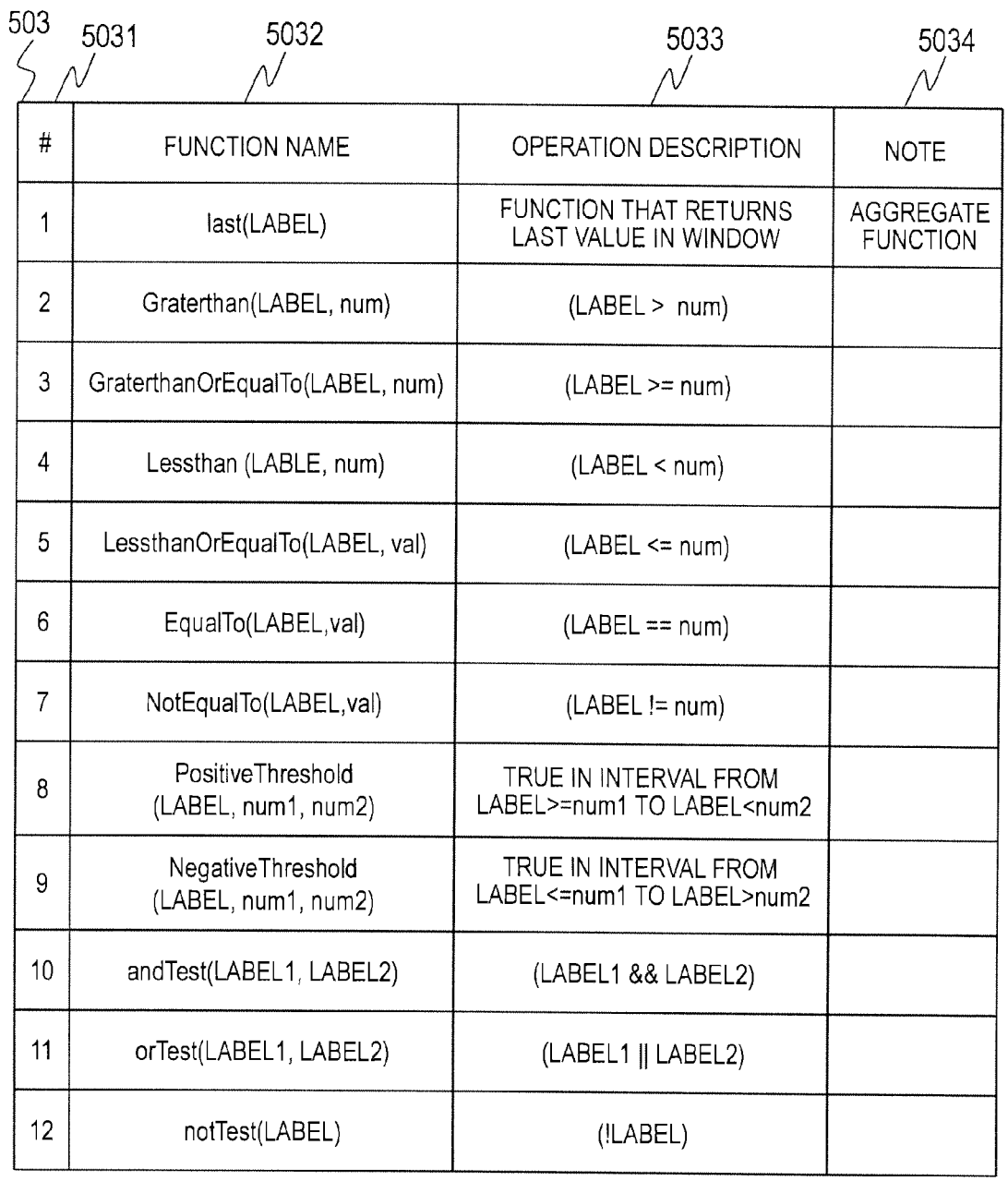
FIG. 16 is an explanatory diagram illustrating an example of a user-defined function of this embodiment.

FIG. 16 is an explanatory diagram illustrating an example of the user-defined function 503 of this embodiment.

The user-defined function 503 includes an identification number 5031, a function name 5032, an operation description 5033, and a note 5034.

The identification number 5031 is an identifier for uniquely identifying a function that is included in the user-defined function 503. The function name 5032 is the name of a function included in the CQL 311. The operation description 5033 is the specifics of the calculation of a function that is associated with the function name 5032. The note 5034 is additional information about the function associated with the function name 5032.

Figure 17:
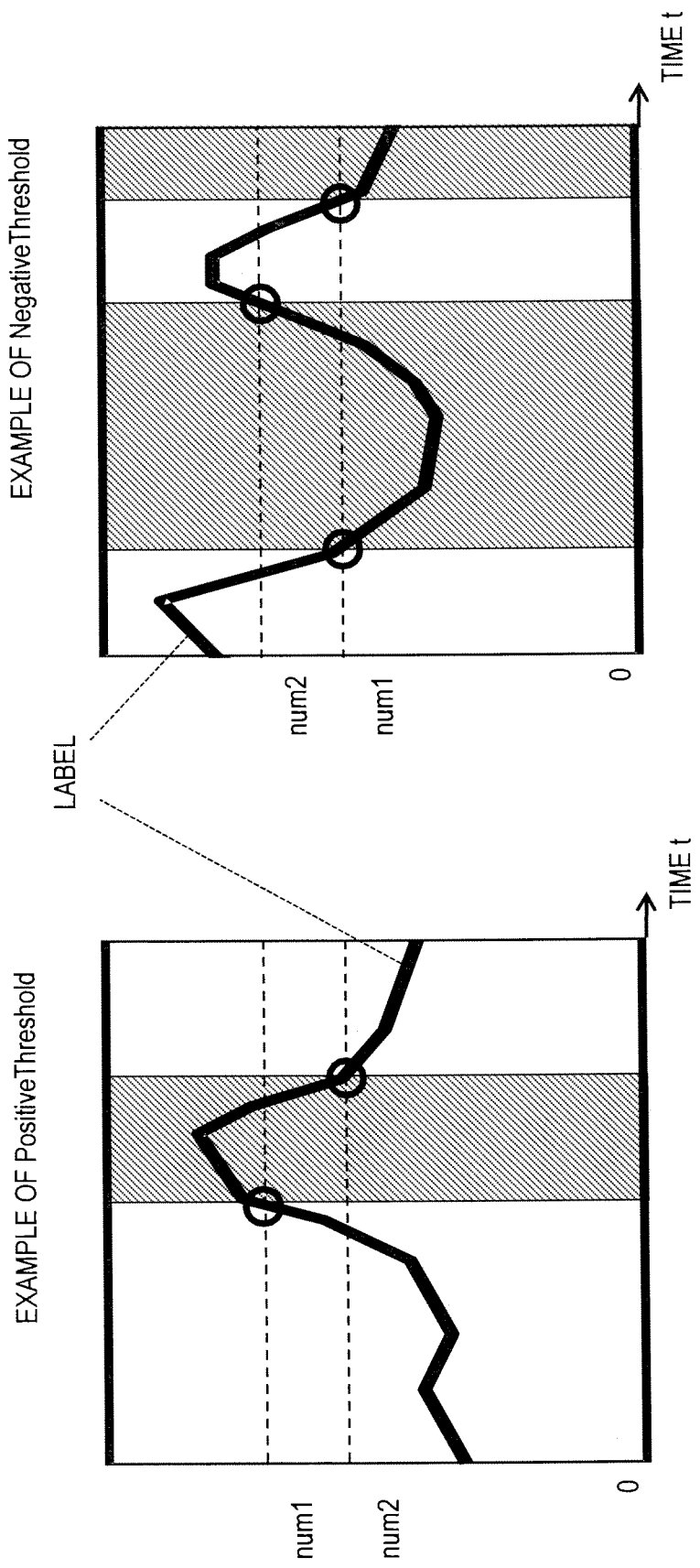
FIG. 17 is an explanatory diagram illustrating examples of data in a given section which is extracted by a function included in a user-definition function of this embodiment.

In the example of FIG. 17, functions whose identification numbers 5031 are "1" to "7" are functions for extracting data in which "LABEL" and "num" satisfy a relation written in the operation description 5033. Functions whose identification numbers 5031 are "8" and "9" are functions for extracting data in which "LABEL" is in a given section which is written in the operation description 5033. Functions whose identification numbers 5031 are "10" to "12" are functions for executing a logical operation written in the operation description 5033.

In a GreaterThanOrEqualTo function of the CQL example 1 (353) illustrated in FIG. 8B, "LABEL" is "L1" and "num" is "70". In a PositiveThreshold function of the CQL example 1 (353), "LABEL" is "L3" and "num1" and "num2" are "300" and "200", respectively.

Data in a given section which is extracted by the functions whose identification numbers 5031 are "8" and "9" is described below.

FIG. 17 is an explanatory diagram illustrating examples of data in a given section which is extracted by a function included in the user-definition function 503 of this embodiment.

A PositiveThreshold example shows data in a given section that is extracted by a function whose identification number 5031 is "8". In the PositiveThreshold example, data in a section where the "LABEL" value is equal to or more than "num1" and less than "num2" is extracted as written in the operation description 5033 of FIG. 17.

A NegativeThreshold example shows data in a given section that is extracted by a function whose identification number 5031 is "9". In the NegativeThreshold example, data in a section where the "LABEL" value is equal to or less than "num1" and more than "num2" is extracted as written in the operation description 5033 of FIG. 17.

Processing executed by the stream data processing unit 306 is described below.

Figure 27:
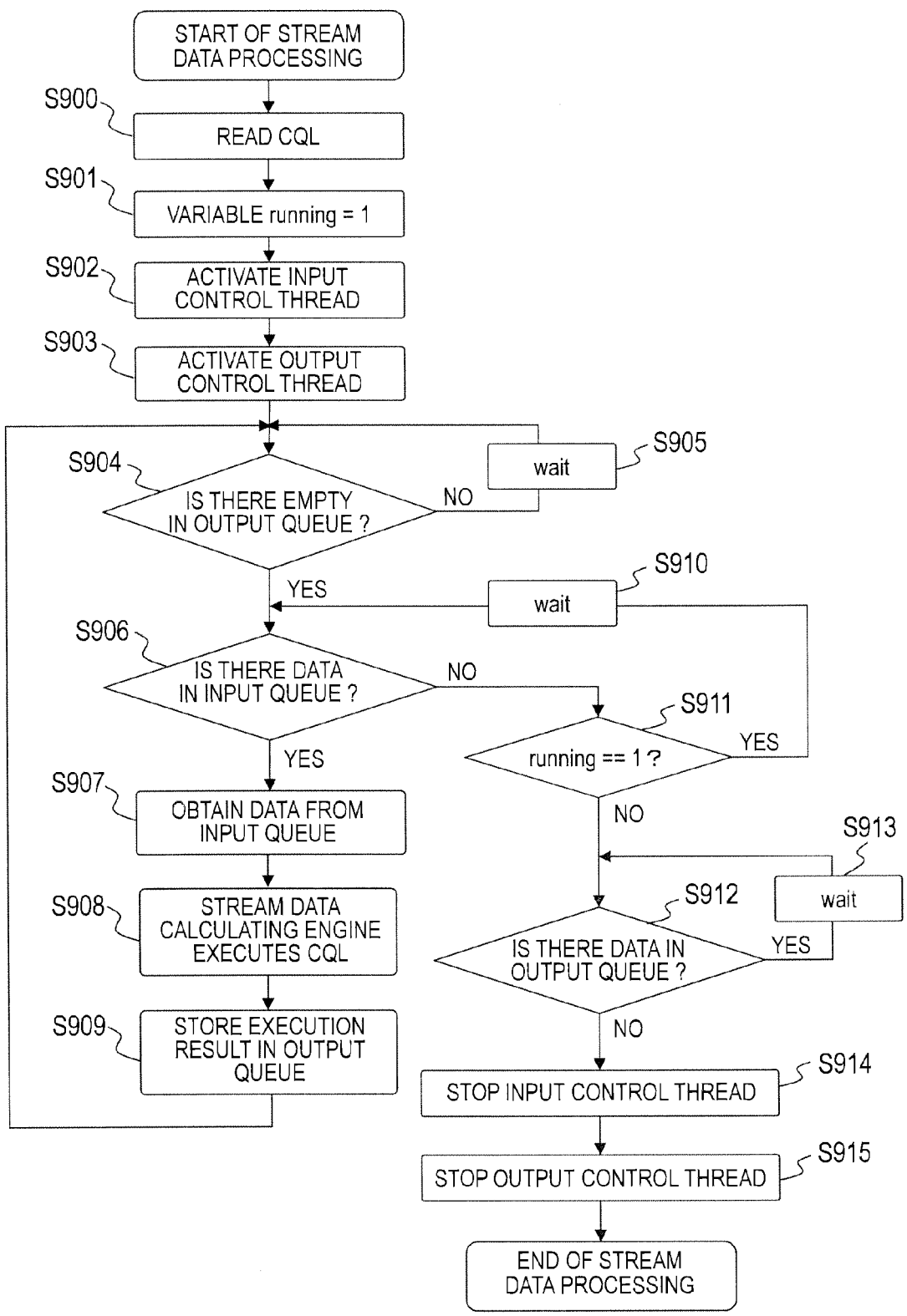
FIG. 27 is a flow chart illustrating an example of processing that is executed by the stream data processing unit of this embodiment.

FIG. 27 is a flow chart illustrating an example of processing that is executed by the stream data processing unit 306 of this embodiment.

The stream data processing unit 306 reads a CQL (S900) and sets a variable running to "1" (S901).

The stream data processing unit 306 next activates an input control thread and an output control thread (S902 and S903), thereby causing the input control unit 500 and the output control unit 505 to start processing. The processing executed by the input control unit 500 is described later with reference to FIG. 28. The processing executed by the output control unit 505 is described later with reference to FIG. 29.

The stream data processing unit 306 determines whether or not there is an empty in the output queue 504 (S904).

In a case where it is determined that there is no empty in the output queue 504, the stream data processing unit 306 keeps waiting until an empty becomes available in the output queue 504 (S905).

In a case where it is determined that there is an empty in the output queue 504, the stream data processing unit 306 determines whether or not there is data stored in the input queue 501 (S906).

In a case where it is determined that there is data stored in the input queue 501, the stream data processing unit 306 obtains data from the input queue 501 (S907).

The stream data processing unit 306 processes the obtained data based on a CQL (S908). Specifically, the stream data processing engine 502 executes the CQL.

The stream data processing unit 306 stores the result of executing the CQL in the output queue 504 (S909), and returns to S904 to execute the same processing. In a case where it is determined in S906 that there is no data stored in the input queue 501, the stream data processing unit 306 determines whether or not the variable running is "1" (S911).

In a case where it is determined that the variable running is "1", the stream data processing unit 306 enters a processing waiting state (S910), and returns to S906 to execute the same processing.

In a case where it is determined that the variable running is not "1", the stream data processing unit 306 determines whether or not there is data stored in the output queue 504 (S912).

In a case where it is determined that there is no data stored in the output queue 504, the stream data processing unit 306 keeps waiting until data is stored in the output queue 504 (S913).

In a case where it is determined that there is data stored in the output queue 504, the stream data processing unit 306 stops the input control thread and the output control thread (S914 and S915), and ends the processing. The processing of the input control unit 500 and the processing of the output control unit 505 are thus ended.

Figure 28:
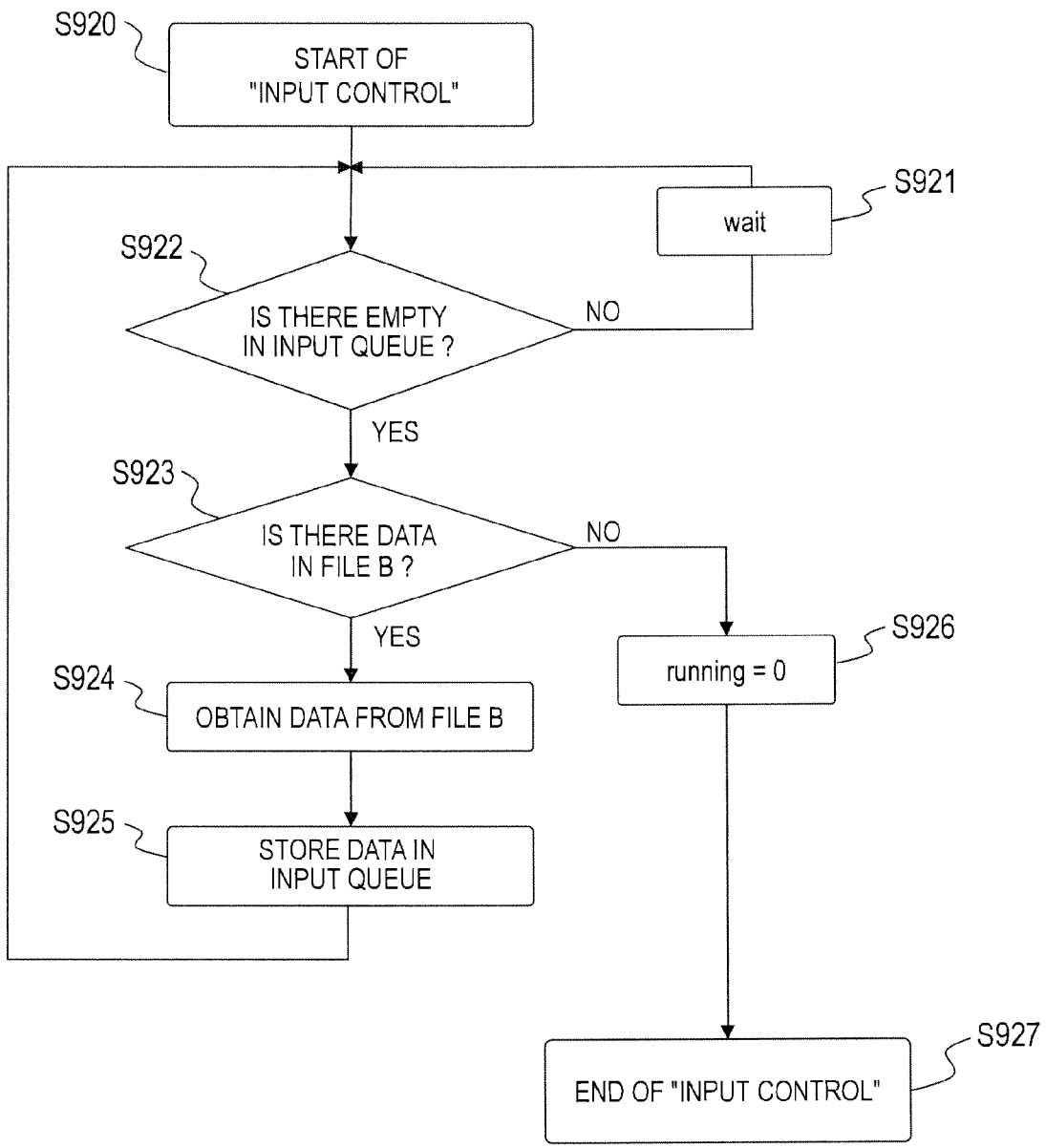
FIG. 28 is a flow chart illustrating an example of processing that is executed by an input control unit of this embodiment.

FIG. 28 is a flow chart illustrating an example of processing that is executed by the input control unit 500 of this embodiment.

The input control unit 500 starts input control processing (S920) and determines whether or not there is an empty in the input queue 501 (S922).

In a case where it is determined that there is no empty in the input queue 501, the input control unit 500 keeps waiting until an empty becomes available in the input queue 501.

In a case where it is determined that there is an empty in the input queue 501, the input control unit 500 determines whether or not there is data stored in the file B 313 (S923).

In a case where it is determined that no data is present in the file B 313, the input control unit 500 sets the variable running to "0" (S926) and ends the processing.

In a case where it is determined that there is data in the file B 313, the input control unit 500 obtains data from the file B 313 (S924), stores the obtained data in the input queue 501 (S925), and returns to S922 to execute the same processing.

Figure 29:
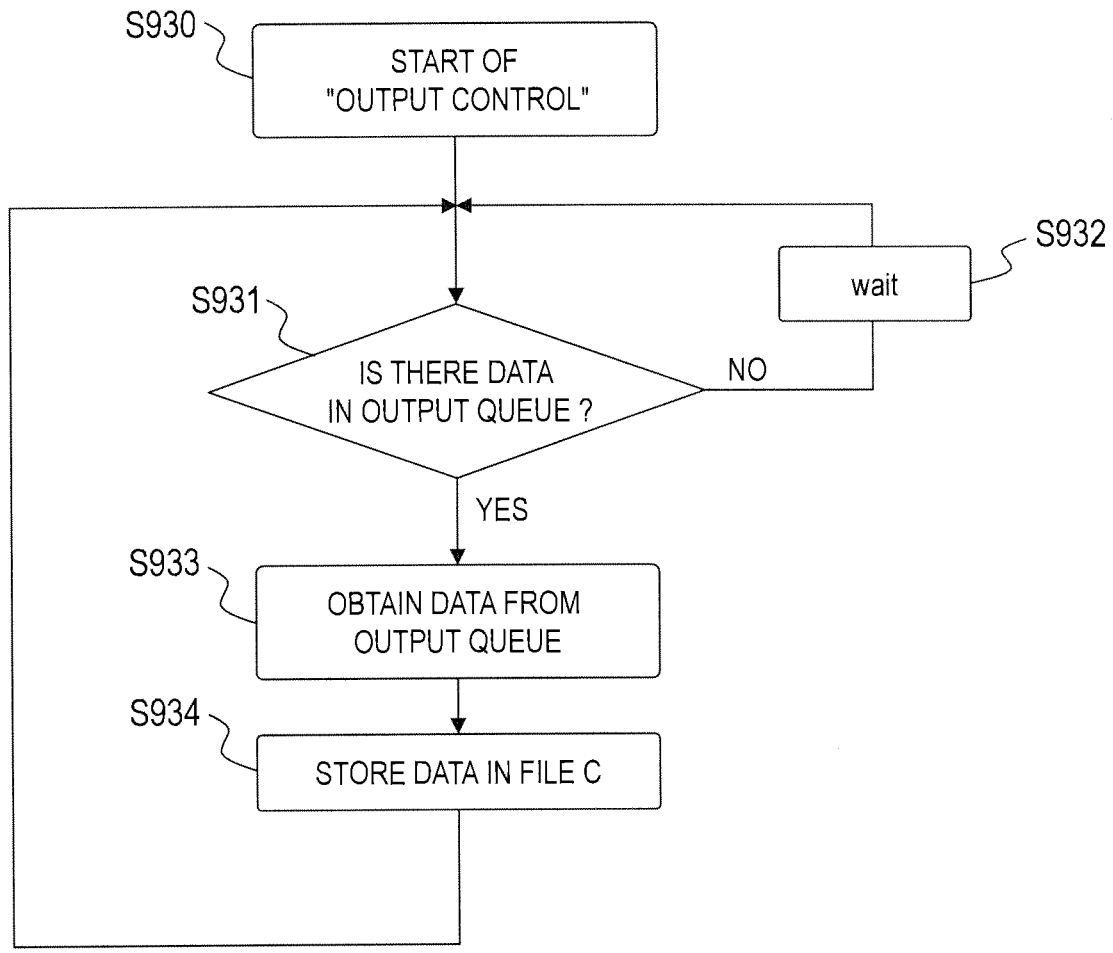
FIG. 29 is a flow chart illustrating an example of processing that is executed by an output control unit of this embodiment.

FIG. 29 is a flow chart illustrating an example of processing that is executed by the output control unit 505 of this embodiment.

The output control unit 505 starts output control processing (S930) and determines whether or not there is data in the output queue 504 (S931).

In a case where it is determined that no data is present in the output queue 504, the output control unit 505 keeps waiting until data is stored in the output queue 504 (S932).

In a case where it is determined that there is data in the output queue 504, the output control unit 505 obtains data from the output queue 504 (S933) and stores the obtained data in the file C 314 (S934). The output control unit 505 then returns to S931 to execute the same processing.

Figure 18A:
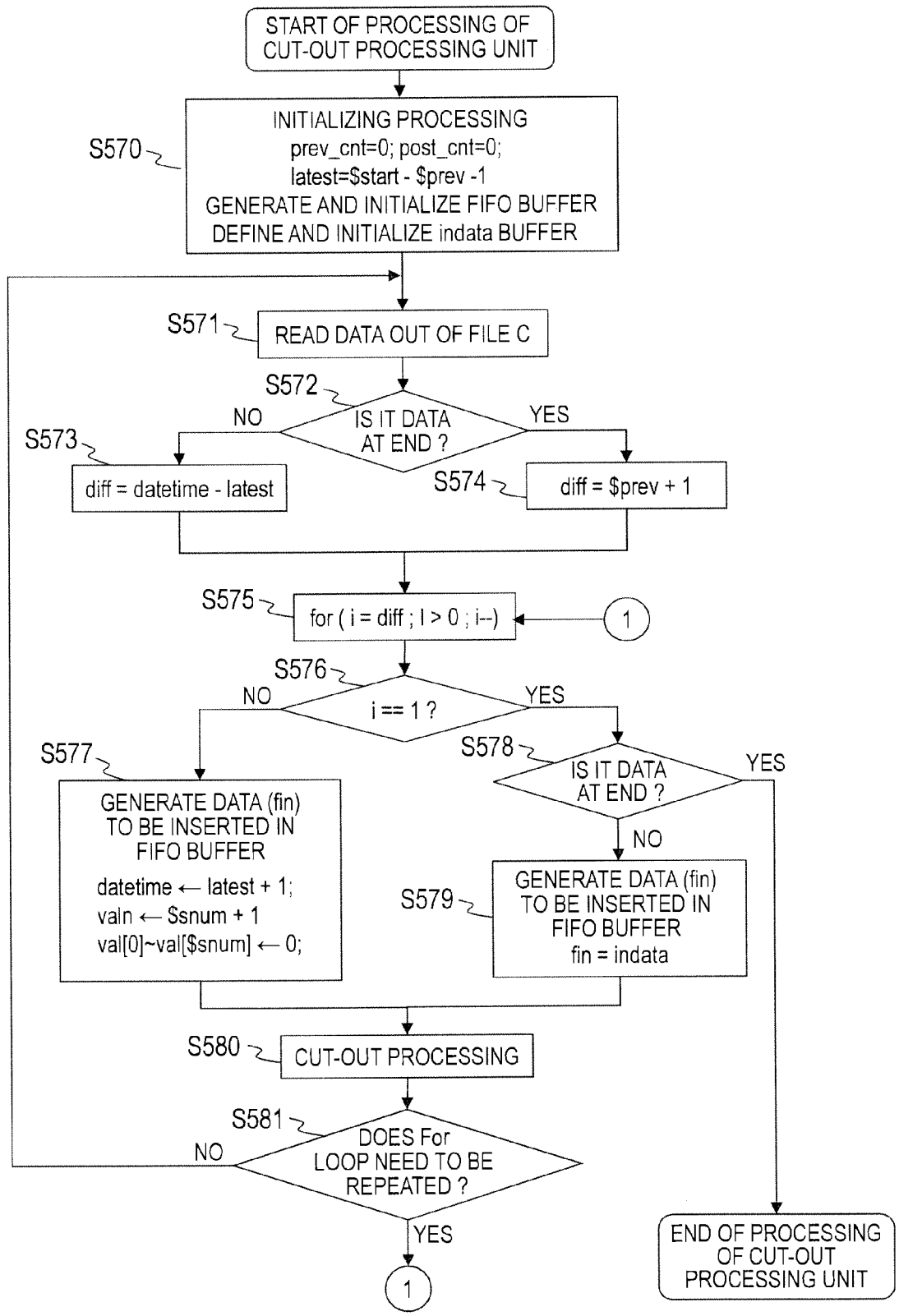
FIG. 18A is a flow chart illustrating an example of processing that is executed by a cut-out processing unit of this embodiment

FIG. 18A is a flow chart illustrating an example of processing that is executed by the cut-out processing unit 307 of this embodiment.

The cut-out processing unit 307 starts the processing after the processing of the stream data processing unit 306 is finished.

The cut-out processing unit 307 executes the initialization of a variable prev_cnt, a variable post_cnt, and the variable latest, the generation and initialization of an FIFO buffer, and the definition and initialization of an indata buffer (S570).

Specifically, the cut-out processing unit 307 initializes the variable preV_cnt and the variable post_cnt to "0". The cut-out processing unit 307 initializes the variable latest to "$start−$prev−1". The cut-out processing unit 307 generates ($prev+1) stages of FIFO buffers, and initializes the generated FIFO buffers to "0". The variable prev_cnt and the variable post_cnt are variables used in cut-out processing, which is described later.

The cut-out processing unit 307 reads one piece of data out of the file C 314 and stores in "indata" (S571). The file C 314 stores calculation results of the select_item phrase and a plurality of pieces of data having the data structure 2 (341) which correspond to one row.

The cut-out processing unit 307 determines whether or not the data read out of the file C 314 is data at the end of pieces of data that are stored in the file C 314 (S572). This is accomplished by, for example, determining whether or not datetime 3411 of the read data is the same as "$end" which is included in the global variable 309.

In a case where it is determined that the data read out of the file C 314 is not data at the end of pieces of data that are stored in the file C 314, the cut-out processing unit 307 set a variable diff to "datetime−latest", by using datetime 3411 of indata and the variable latest (S573), and then proceeds to S575.

In a case where it is determined that the data read out of the file C 314 is data at the end of pieces of data that are stored in the file C 314, the cut-out processing unit 307 set the variable diff to "$prev+1" (S574), and then proceeds to S575.

The cut-out processing unit 307 substitutes the value set to the variable diff in the variable i, and repeats the processing until the variable i a becomes smaller than "0" (S575).

The cut-out processing unit 307 determines whether or not the variable i is "1" (S576).

Determining that the variable i is not "1", the cut-out processing unit 307 generates dummy data to be inserted in the FIFO buffers (hereinafter also referred to as insertion data) (S577), and proceeds to S580.

Specifically, insertion data having the data structure 2 (341) is generated. In this case, "latest+1" is set as datetime 3411 of the insertion data, and "$snum+1" is set as valn 3412. A value indicating null data (NaN) is set as val[0] to val [$snum−1] of the data 3413 of the insertion data, and "0" is set as val[$snum].

In a case where it is determined that the variable i is "1", the cut-out processing unit 307 determines whether or not the data (indata) read out of the file C 314 is data at the end of pieces of data that are stored in the file C314 (S578). The method performed in S572 is used for this determination.

In a case where it is determined that the data (indata) read out of the file C 314 is data at the end of pieces of data that are stored in the file C 314, the cut-out processing unit 307 ends the processing.

In a case where it is determined that the data (indata) read out of the file C 314 is not data at the end of pieces of data that are stored in the file C 314, the cut-out processing unit 307 generates input data (S579) and proceeds to S580. Specifically, the cut-out processing unit 307 sets a value stored in "indata" to the input data.

The cut-out processing unit 307 executes cut-out processing using the input data (S580). Details of the cut-out processing are described later with reference to FIG. 18B.

The cut-out processing unit 307 determines whether or not to repeat the processing (S581 and S575). In other words, the cut-out processing unit 307 determines whether or not to continue executing a for statement loop of S575. Specifically, whether or not "i>0" is satisfied after decrementing the variable i is determined. In a case where the result of the determination is true, it is determined that the processing is to be repeated.

In a case where it is determined that the processing is to be repeated, the cut-out processing unit 307 returns to S575 to execute the same processing (S575 to S581).

In a case where it is determined that the processing is not to be repeated, the cut-out processing unit 307 returns to S571 to execute the same processing (S571 to S581).

Figure 18B:
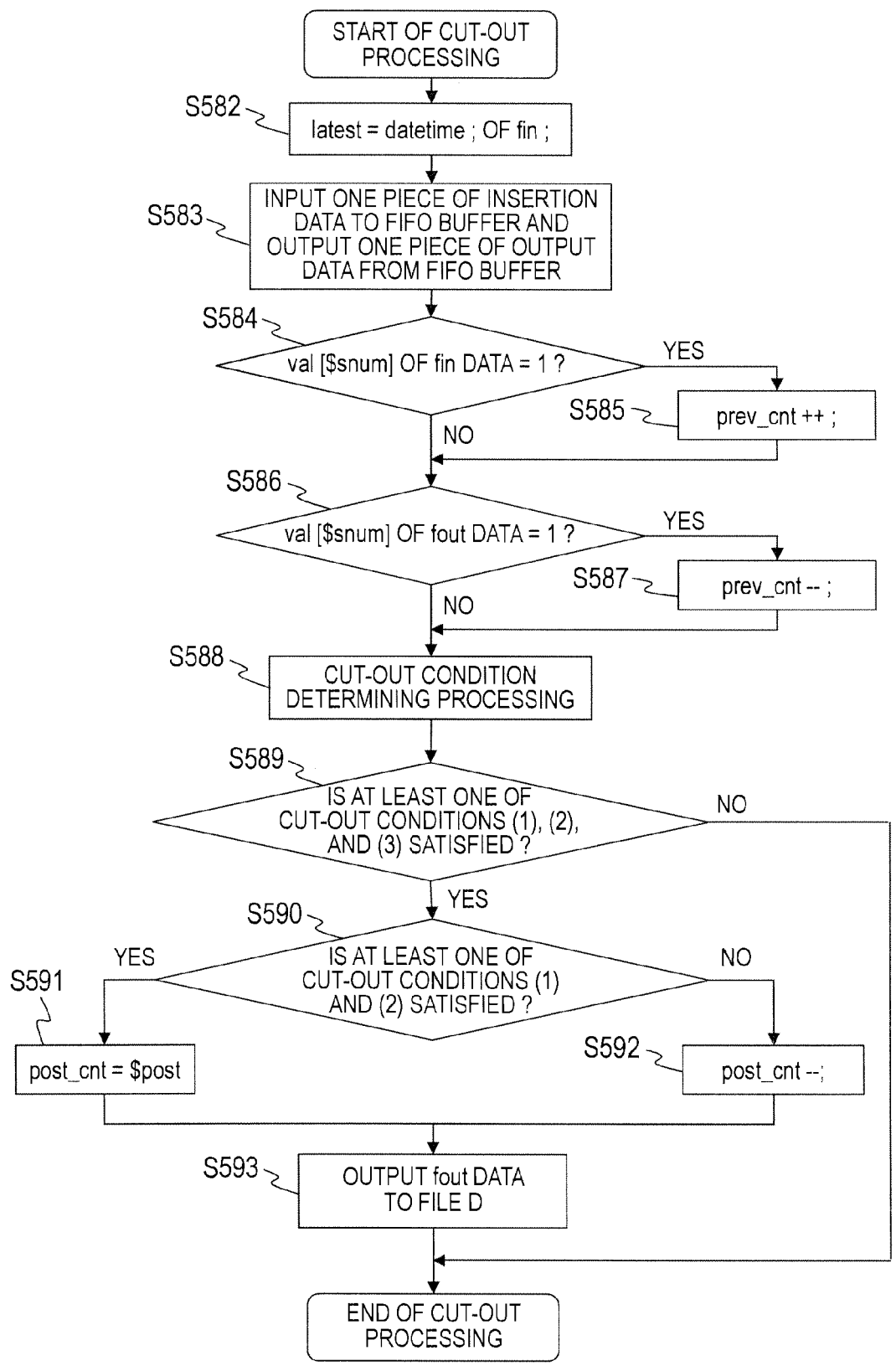
FIG. 18B is a flow chart illustrating details of a cut-out processing of this embodiment.

FIG. 18B is a flow chart illustrating details of the cut-out processing of this embodiment.

The cut-out processing unit 307 sets datetime of insertion data to the variable latest (S582).

The cut-out processing unit 307 inputs one piece of insertion data to an FIFO buffer and outputs one piece of data from the FIFO buffer (S583). In the following description, data output from an FIFO buffer is also referred to as output data.

The cut-out processing unit 307 determines whether or not val[$snum] of the input insertion data is "1" (S584).

In a case where it is determined that val[$snum] of the input insertion data is not "1", the cut-out processing unit 307 proceeds to S586.

In a case where it is determined that val[$snum] of the input insertion data is "1", the cut-out processing unit 307 adds "1" to the value of the variable prev_cnt (S585), and proceeds to S586.

The cut-out processing unit 307 determines whether or not val[$snum] of the output data that has been output is "1" (S586).

In a case where it is determined that val[$snum] of the output data that has been output is not "1", the cut-out processing unit 307 proceeds to S588.

In a case where it is determined that val[$snum] of the output data that has been output is "1", the cut-out processing unit 307 decreases the value of the variable prev_cnt by "1" (S587), and proceeds to S588.

The cut-out processing unit 307 executes cut-out condition determining processing based on the values of the variable prev_cnt, the variable post_cnt, and val[$snum] of the input insertion data (S588). Specifically, determination processing to be described below is executed.

In S588, the cut-out processing unit 307 executes three types of determination processing.

Firstly, the cut-out processing unit 307 determines whether or not the value of the variable prev_cnt is larger than "0". This determination is hereinafter referred to as cut-out condition (1).

Secondly, whether or not the value of val[$snum] of the output data that has been output is "1". This determination is hereinafter referred to as cut-out condition (2).

Thirdly, the cut-out processing unit 307 determines whether or not the value of the variable post_cnt is larger than "0". This determination is hereinafter referred to as cut-out condition (3).

Based on the results of executing the cut-out condition determining processing, the cut-out processing unit 307 determines whether or not at least one of the cut-out conditions (1), (2), and (3) is satisfied (S589).

In a case where it is determined that none of the cut-out conditions (1), (2), and (3) is satisfied, the cut-out processing unit 307 ends the cut-out processing S580 and proceeds to S581.

In a case where it is determined that at least one of the cut-out conditions (1), (2), and (3) is satisfied, the cut-out processing unit 307 determines whether or not at least one of the cut-out conditions (1) and (2) is satisfied based on the result of executing the cut-out condition determining processing (S590).

In a case where it is determined that at least one of the cut-out conditions (1) and (2) is satisfied, the cut-out processing unit 307 sets the value of "$post" to the variable post cnt (S591), and proceeds to S593.

In a case where it is determined that neither of the cut-out conditions (1) and (2) is satisfied, the cut-out processing unit 307 decreases the variable post_cnt by 1 (S592), and proceeds to S593.

The cut-out processing unit 307 outputs fout data to the file D 315 (S593), ends the cut-out processing in S580, and proceeds to S581.

This processing allows only data that satisfies cut-out conditions to be output to the file D 315. The file D 315 stores an output result in which data satisfies a condition specified in the whre_condition phrase of the query 155, and offsets preceding and following the data are added.

Specifically, in S588 and S589, the cut-out processing unit 307 gives each piece of insertion data a flag indicating that the cut-out condition (1) is satisfied, a flag indicating that the cut-out condition (2) is satisfied, and a flag indicating that the cut-out condition (3) is satisfied. The cut-out processing unit 307 also determines whether or not the respective cut-out conditions are satisfied based on the flags.

Described below is an output result that is output through the processing executed by the cut-out processing unit 307.

Figure 19:
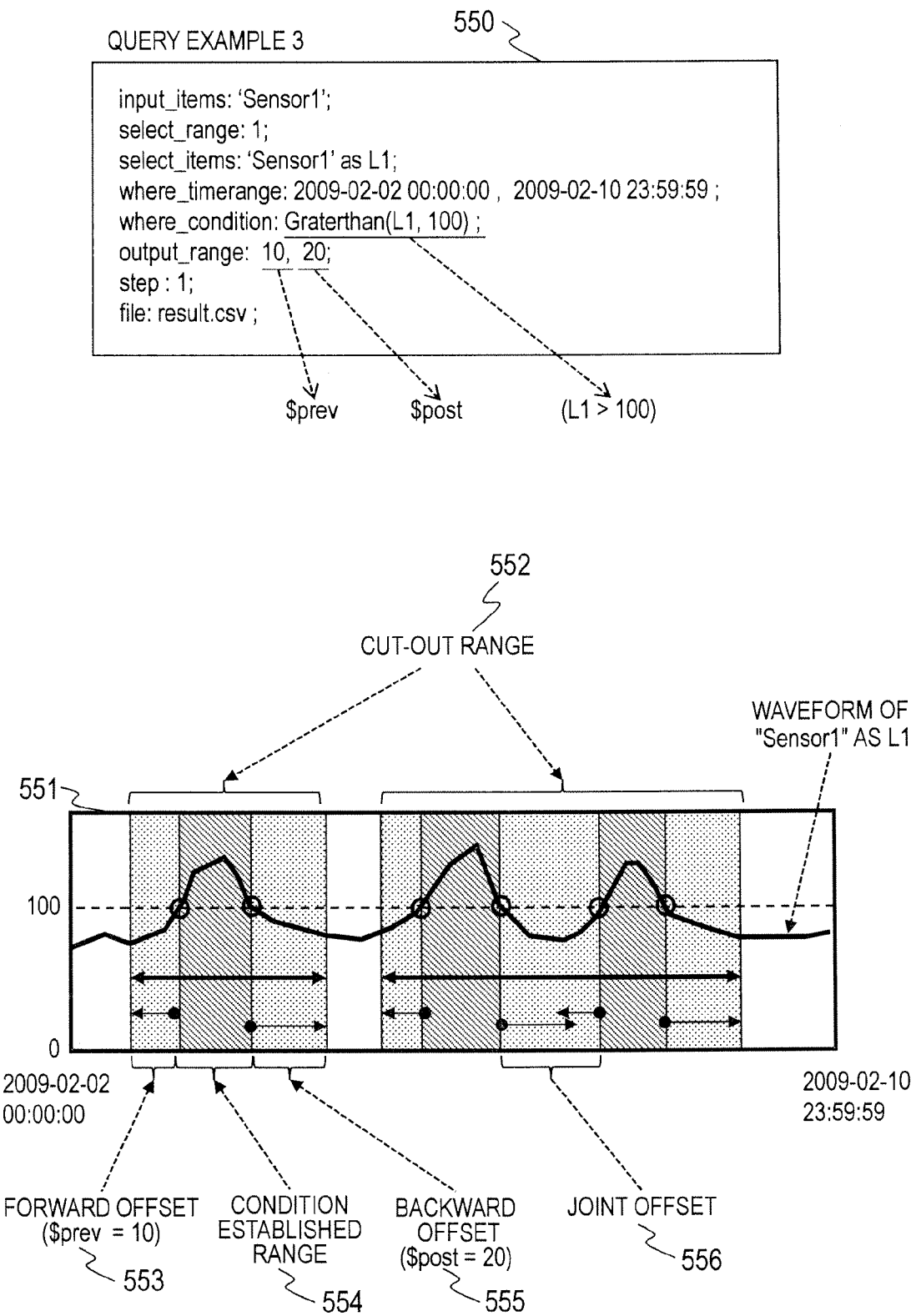
FIG. 19 is an explanatory diagram illustrating an example of an output result that is output by the cut-out processing unit of this embodiment.

FIG. 19 is an explanatory diagram illustrating an example of an output result that is output by the cut-out processing unit 307 of this embodiment.

In a case of being input a query of a query example 3 (550), the cut-out processing unit 307 outputs a result illustrated as an output result 551.

Specifically, the cut-out processing unit 307 outputs a cut-out range 552 that includes a condition established range 554, where Sensor1 whose LABEL is "L1" in the where_condition phrase has a value equal to or larger than "100", a forward offset 553, and a backward offset 555, or a cut-out range 552 that includes condition established ranges 554, a forward offset 553, a backward offset 555, and a joint offset 556.

In other words, data within a range such as the cut-out range 552 is cut out and output as an output result.

The joint offset 556 is obtained by joining parts where the forward offset 553 and the backward offset 555 overlap with each other as one offset.

This output result is generated based on a flag that is given in S589 of FIG. 18B. In other words, insertion data which is given a flag of one of the cut-out conditions (1) to (3) is output as the cut-out range 552. Specifics thereof are as follows:

Insertion data that is given the flag of the cut-out condition (2) is output as data that is included in the condition established range 554 out of the cut-out range 552.

Insertion data that is given the flag of the cut-out condition (1) is output as data that is included in the forward offset 553 out of the cut-out range 552.

Insertion data that is given the flag of the cut-out condition (3) is output as data that is included in the backward offset 555 out of the cut-out range 552.

The cut-out processing unit 307 cuts out pieces of insertion data that respectively match the cut-out conditions (1) to (3), sorts the cut out data chronologically, and outputs the sorted data.

Insertion data that is given flags of two or more of the cut-out conditions (1) to (3) is output as the cut-out range 552 that includes the joint offset 556.

Figure 20:
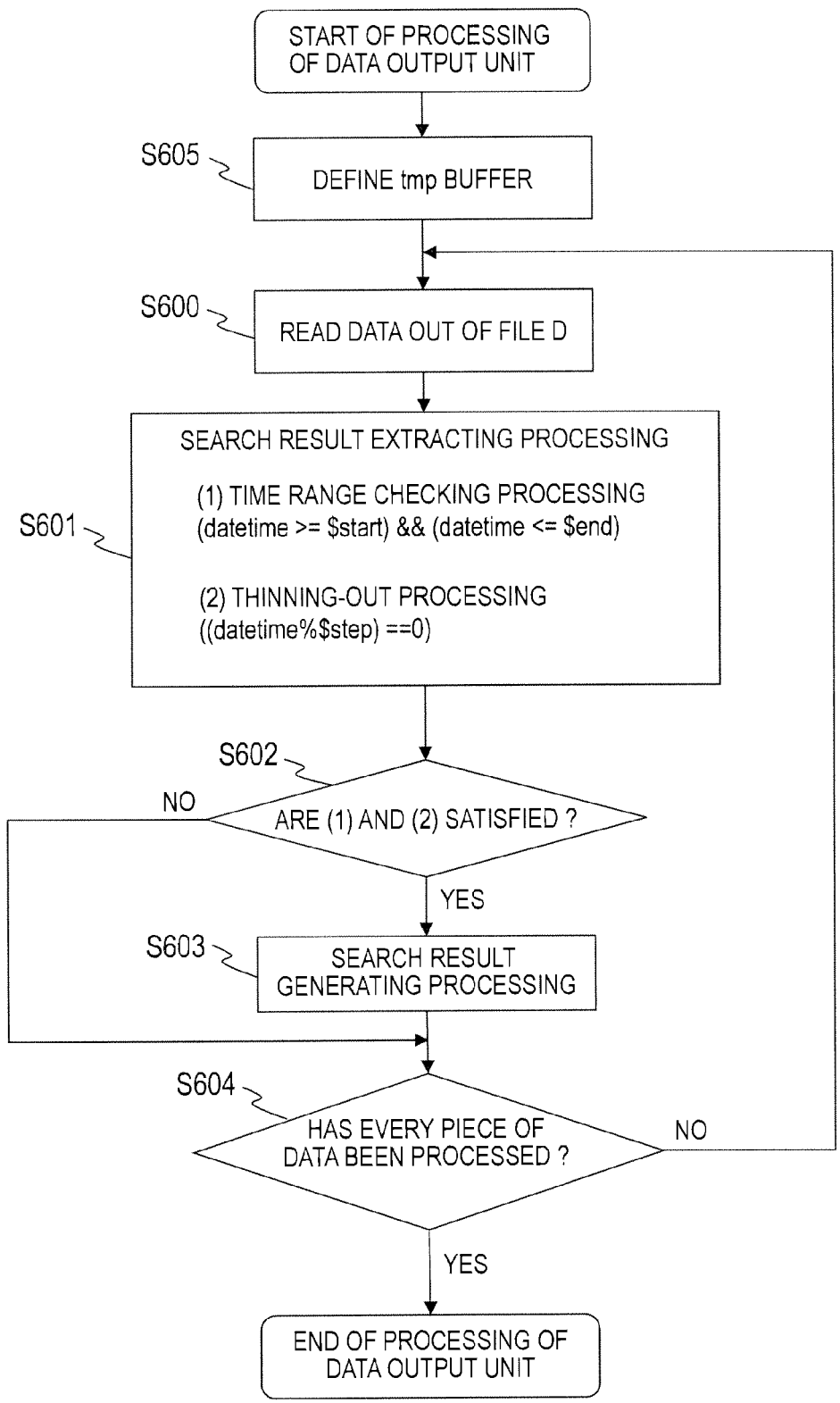
FIG. 20 is a flow chart illustrating an example of processing that is executed by a data output unit according to the embodiment of this invention.

FIG. 20 is a flow chart illustrating an example of processing that is executed by the data output unit 308 according to the embodiment of this invention.

The data output unit 308 defines a tmp buffer (S605).

The data output unit 308 reads data out of the file D 315 and stores the read data in tmp (S600). The read data is a calculation result of the select_items phrase and has the data structure 2 (341) which corresponds to one row.

The data output unit 308 refers to datetime 3411 of the read data and executes search result extracting processing (S601). Specifically, the following two processing procedures are executed:

Firstly, the data output unit 308 determines whether or not a value stored as datetime 3411 is included in a time range specified in the where_timerange phrase of the query 155. In other words, whether or not a value stored as datetime 3411 is equal to or more than "$start" and equal to or less than "$end". Hereinafter, this determination is referred to as output condition (1).

The processing of determining whether or not the output condition (1) is matched is executed because the range of data searched by the SQL 310 is broader than the time range specified in the query 155. In other words, the reason is that "$db_start" (see FIG. 11B) which is used to generate the SQL 310 processes data preceding the time of "$start" as well, as has been described with reference to FIG. 11B.

Secondly, the data output unit 308 executes thinning-out processing. Specifically, the data output unit 308 determines whether or not the remainder is "0" when a value stored as datetime 3411 is divided by a value specified in the step phrase of the query 155, namely, "$step". This determination is hereinafter referred to as output condition (2). In a case of the query example 1 (350), data is output every five seconds under the output condition (2).

The data output unit 308 determines whether or not the output condition (1) and the output condition (2) are satisfied based on the result of the search result extracting processing in S601 (S602).

In a case where it is determined that the output condition (1) and the output condition (2) are not satisfied simultaneously, the data output unit 308 proceeds to S604, which means that the data in question is not output.

In a case where it is determined that the output condition (1) and the output condition (2) are satisfied, the data output unit 308 executes search result generating processing (S603). Specifically, the data output unit 308 converts data that is stored in tmp into a CSV format such as the data structure 3 (342), and outputs to the search result file 156.

The data output unit 308 determines whether or not every piece of data stored in the file D 315 has been processed (S604).

In this embodiment, compressed data that is obtained by compressing one hour of data is searched for in database search processing, the compressed data of one hour of data is decompressed by data decompressing/sorting processing to generate second-by-second data, and the second-by-second data is subsequently processed by stream data processing, cut-out processing, and output data generating processing. In the output data generating processing, data is processed on a second-by-second basis whereas outputting data is executed on a basis specified by $step.

The system can thus search for an anomaly in one of the plants 102 quickly without lowering the precision of anomaly search, and can output a data range for identifying the cause of the anomaly.

FIG. 21 is an explanatory diagram illustrating an example of the query 155 and the SQL 310 that are used to execute feature value search processing in this embodiment.

In a case of executing the feature value search processing, the difference is that a meta_search phrase is added to the query 155. This allows a search that uses the MaxVal column 2084 and the MinVal column 2085 which are included in the DAT table 208.

As illustrated in FIG. 21, the target of a search in a query example 4 (700) is data that has a value larger than "100" as the value of the MaxVal column 2084.

In a case where the data search module 157 receives the query 155 that includes a meta_search phrase, the feature value search-use SQL generating unit 302 generates an SQL of an SQL example 4-1 (701) illustrated in FIG. 21 and, after the SQL of the SQL example 4-1 (701) is executed, generates an SQL of an SQL example 4-2 (702).

The SQL of the SQL example 4-1 (701) is a time cut-out-use SQL, and is an SQL for extracting a time (Datetime) of data that matches a feature value.

The SQL of the SQL example 4-2 (702) is a feature value search-use SQL, and is an SQL for executing a search of the database 154 within the range of Datetime extracted by the SQL of the SQL example 4-1 (701).

The SQL of the SQL example 4-2 (702) is the SQL 310 as in the SQL example 1 (352). Compared to the SQL example 1 (352), the SQL of the SQL example 4-2 (702) is significantly reduced in time required for search processing because the search range is limited as a result of executing the SQL of the SQL example 4-1 (701).

For example, in a case where an anomaly value is known in advance, executing search processing with the use of the anomaly value shortens the processing time by narrowing down the range of data searched from the search range of the case where all pieces of data are searched.

In the query example 4 of FIG. 21, a user does not always need to specify the meta_search phrase. In a determination that uses a threshold, time-series data that exceeds a threshold is generally included in a packet set where the maximum value exceeds the threshold. Similarly, time-series data that is smaller than a threshold is included in a packet set where the minimum value is smaller than the threshold. A meta_search phrase can be generated automatically by managing such query conversion rules. Specifically, in a case where a greaterthan phrase and a threshold are specified in the where_condition phrase in the query example 4 of FIG. 21, MaxVal>threshold is automatically assigned as a phrase that means that the maximum value exceeds the threshold in the meta_seatch phrase. In a case where a lessthan phrase and a threshold are specified in the where_condition phrase, MinVal<threshold is automatically assigned as a phrase that means that the maximum value exceeds the threshold in the meta_seatch phrase. Such query conversion rules may be registered in the system in advance, or the system may be designed so that a user can register query conversion rules later.

FIG. 22 is an explanatory diagram illustrating SQL templates for generating the SQL 310 that is used for a search of a feature value in this embodiment.

The feature value search-use SQL generating unit 302 holds a time cut-out-use SQL template 710 and a feature value search-use SQL template 711.

The time cut-out-use SQL template 710 is a template for generating the SQL 310 that is used to execute a feature value search, and the generated SQL is for extracting the time of compressed data that contains data matching a feature value.

Specifically, the generated SQL is for searching a table that is obtained by combining the SID table 207 and the DAT table 208 where the ID column 2072 and the ID column 2082 store the same values, for a time (Datetime) based on a given condition.

The given condition is defined in a part that follows the where phrase. Defined as the given condition is to sort data chronologically and extract data that matches a specified sensor name, a specified feature value, and a specified time section.

The feature value search-use SQL template 711 is a template for generating the SQL 310 that is used to execute a feature value search, and the generated SQL is for searching compressed data within the range of time extracted by the SQL that is generated by using the time cut-out-use SQL template 710.

In the example of FIG. 22, the generated SQL is for searching a table that is obtained by combining the SID table 207 and the DAT table 208 where the ID column 2072 and the ID column 2082 store the same values, for a time (Datetime), a sensor name (SID.Name), and compressed data (DAT.CDATA) based on a given condition.

The given condition is defined in a part that follows the where phrase. Defined as the given condition is to sort data chronologically and obtain data that matches a specified sensor name and a specified time section.

Figure 23:
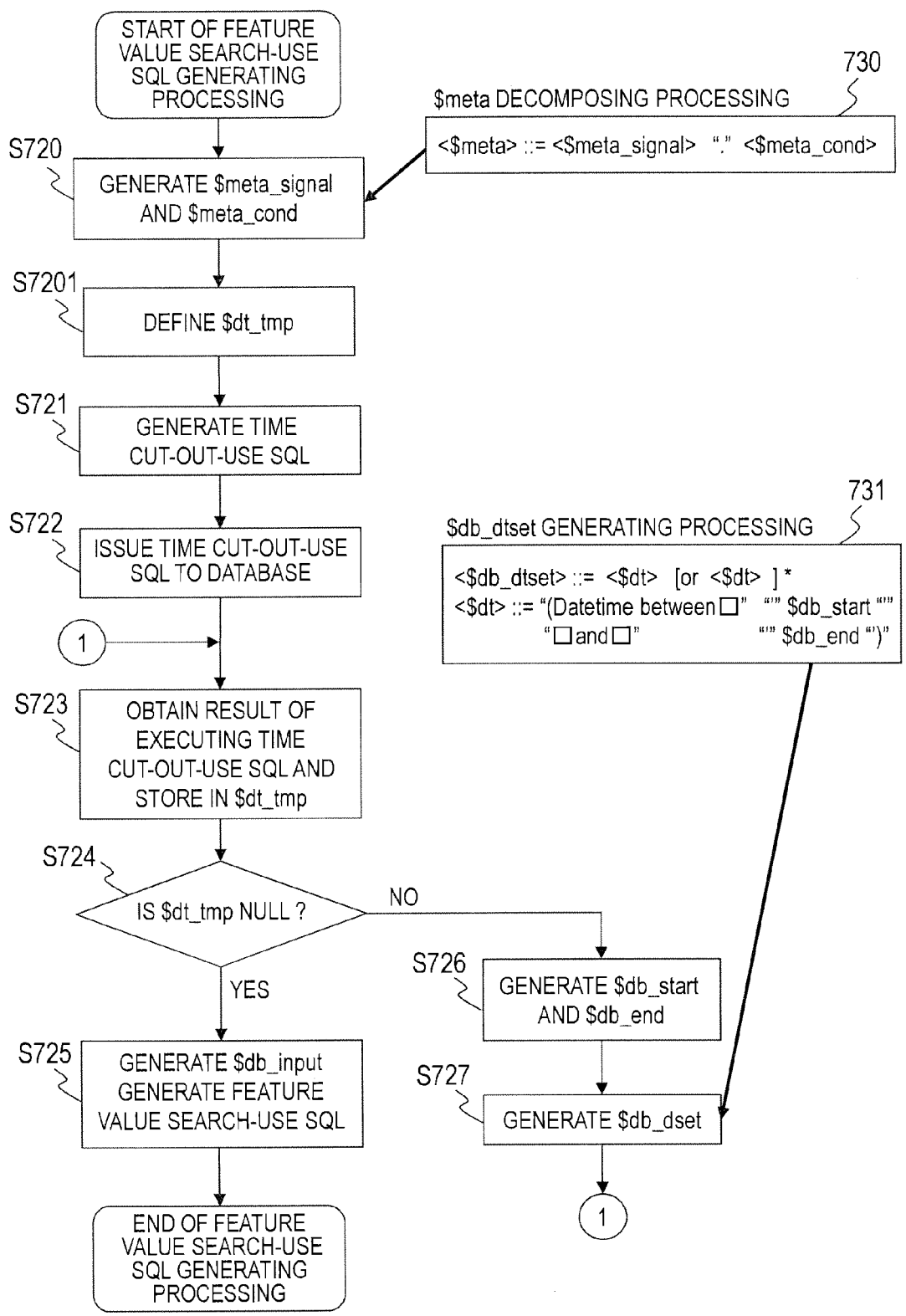
FIG. 23 is a flow chart illustrating an example of processing that is executed by a feature value search-use SQL generating unit of this embodiment.

FIG. 23 is a flow chart illustrating an example of processing that is executed by the feature value search-use SQL generating unit 302 of this embodiment.

The feature value search-use SQL generating unit 302 generates "$meta_signal" and "$meta_cond", by using the global variable 309 (S720). Specifically, the feature value search-use SQL generating unit 302 executes $meta decomposing processing 730 with the use of "$meta" which is included in the global variable 309. In other words, the feature value search-use SQL generating unit 302 decomposes "$meta" into "$meta_signal" and "$meta_cond".

The feature value search-use SQL generating unit 302 defines a work-use variable $dt_tmp (S7201).

The feature value search-use SQL generating unit 302 generates a time cut-out-use SQL (S721).

Specifically, the feature value search-use SQL generating unit 302 first sets "$meta_start"="$start", and further initializes the minute value and the second value to "0". The feature value search-use SQL generating unit 302 also sets "$meta_end"="$end". The feature value search-use SQL generating unit 302 next substitutes "$meta_signal", "$meta_cond", "$meta_start", and "$meta_end" in the time cut-out-use SQL template 710, to thereby generate a time cut-out-use SQL.

The feature value search-use SQL generating unit 302 issues the time cut-out-use SQL to the database 154 (S722).

The feature value search-use SQL generating unit 302 obtains an execution result from the database 154 for which the time cut-out-use SQL has been executed, and stores in $dt_tmp (S723). Specifically, time data that matches a condition specified in the time cut-out-use SQL is obtained as an execution result and stored in $dt_tmp.

The feature value search-use SQL generating unit 302 determines whether or not one row of data stored in $dt_tmp is null (S724). In other words, whether or not every execution result has been processed is determined.

In a case where it is determined that one row of data stored in $dt_tmp is null, the feature value search-use SQL generating unit 302 generates $db_input so that $db_input=$input is satisfied, further generates a feature value search-use SQL (S725), and ends the processing. Specifically, the feature value search-use SQL generating unit 302 substitutes "$db_input" and "$db_dtset" in the feature value search-use SQL template 711, to thereby generate a feature value search-use SQL.

In a case where it is determined that one row of data stored in $dt_tmp is not null, the feature value search-use SQL generating unit 302 calculates the start time and end time, namely, "$db_start" and "$db_end", of a time-series data block in which sensor data at a time $dt_tmp is stored (S726).

Specifically, the feature value search-use SQL generating unit 302 calculates "$db_start=$dt_tmp−$range" for "$db_start", and further initializes the minute value and the second value of this calculation result to "0". For "$db_end", the feature value search-use SQL generating unit 302 stores a value obtained by calculating "$db_end=$db_start+3599". The value "3599" is added because, in this embodiment, compressed data of one hour of data is stored in the database.

The feature value search-use SQL generating unit 302 generates "$db_dtset", by using "$db_start" and "$db_end" calculated in S726 (S727), and returns to S723 to execute the same processing. Specifically, the feature value search-use SQL generating unit 302 executes $db_dtset generating processing with the use of "$db_start" and "$db_end".

Figure 24:
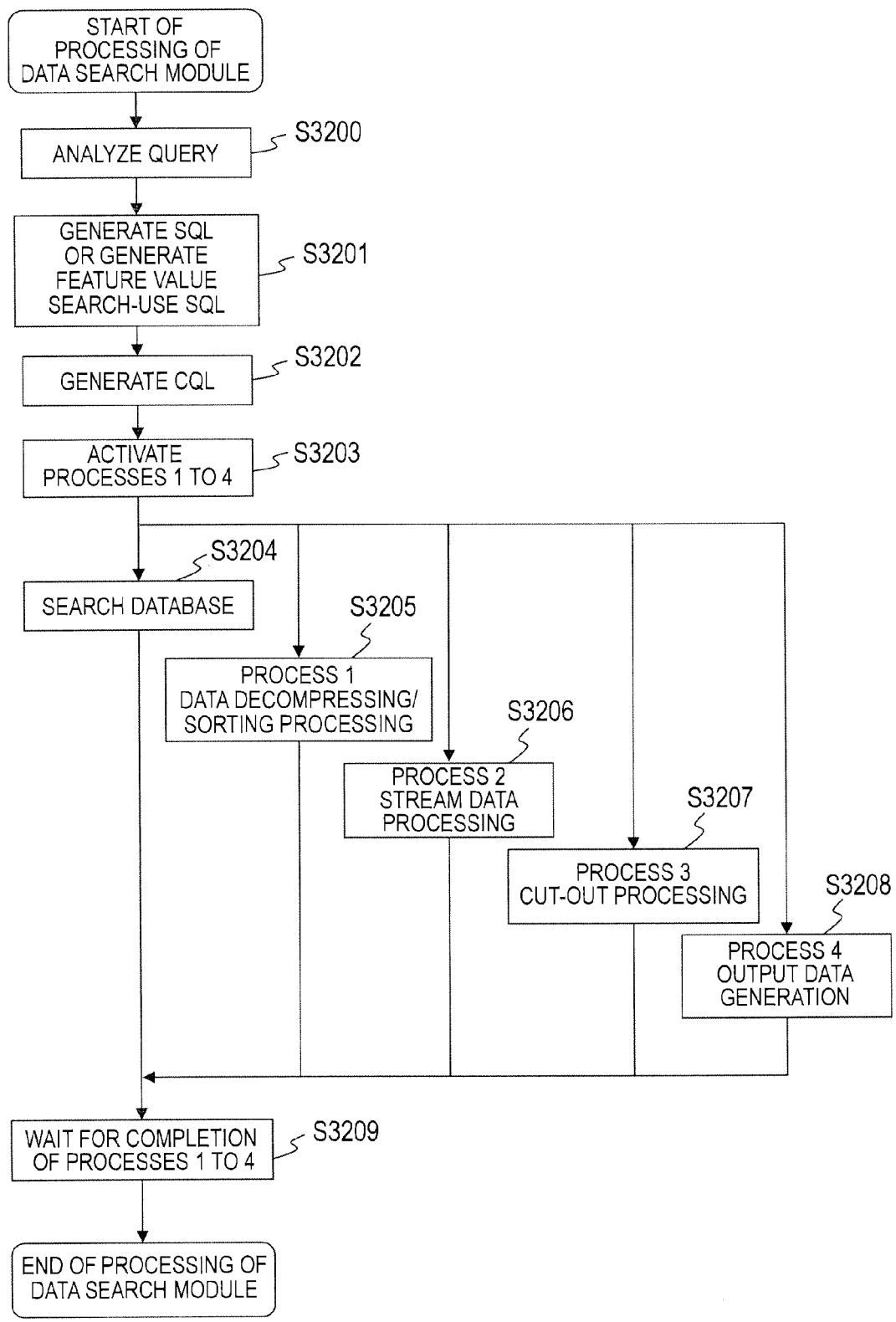
FIG. 24 is a flow chart illustrating a case where processing procedures that are executed by the data search module are executed in parallel in this embodiment.

FIG. 24 is a flow chart illustrating a case where processing procedures that are executed by the data search module 157 are executed in parallel in this embodiment.

The CPU 121 includes a plurality of cores and, as illustrated in FIG. 24, is capable of executing processing procedures of respective processes 1 to 4 at the same time as the execution of a database search 3204.

Steps S3200 to S3202 are the same as S320 to S323 and S327 of FIG. 9, and a description thereof is omitted here.

The data search module 157 activates the processes 1 to 4 (S3203) and executes the respective processing procedures in the processes 1 to 4 (S3204 to S3208).

Specifically, data decompressing/sorting processing is executed in the process 1, stream data processing is executed in the process 2, cut-out processing is executed in the process 3, and output data generating processing is executed in the process 4.

This way, instead of outputting the results of the respective processing procedures to the files A 312 to D 315, an output result of one process is handed over to another process, thereby speeding up processing.

According to this embodiment, the amount of data stored in a database is reduced by storing, in the database, compressed data that is obtained by compressing time-series data into a given time unit. In addition, an SQL for a compressed data search and a CQL for processing decompressed data can be generated by receiving one query. Further, a cut-out range that combines a range in which a condition specified in the CQL is satisfied with sections preceding and following this range is output, to thereby output not only data of the place of an anomaly but also time-series data preceding and following the anomaly. Tracing for identifying the place of anomaly and the cause of the anomaly is thus facilitated.

This keeps the required disk capacity of the center server 104 from increasing and facilitates an analysis of the cause of an anomaly in a plant.

Moreover, the processing time is reduced by storing compressed data together with a feature value in the database 154 and executing a search with the use of the feature value.

This invention has been described in detail with reference to the accompanying drawings. However, those concrete configurations are not to limit this invention, and this invention encompasses various modifications and equivalent configurations within the spirit of the scope of claims set forth below.

This invention is applicable to the preventive maintenance of factory equipment, plant equipment, or the like where a huge amount of data is handled.

What is claimed is:

1. A database management method executed in a computer for managing a database,
the computer having a processor and a memory connected to the processor,
the database storing a plurality of pieces of compressed data which are compressed based on a given condition,
the database management method including:
a first step of analyzing, by the computer, a query for the database which is received from a client computer coupled to the computer;
a second step of generating, by the computer, a first inquiry for searching the database for at least one of the plurality of pieces of compressed data, based on a result of the analysis of the received query;
a third step of generating, by the computer, a second inquiry for executing a search of a plurality of pieces of time-series data obtained from the at least one of the plurality of pieces of compressed data, which is a response result of the first inquiry, based on the result of the analysis of the received query;
a fourth step of issuing, by the computer, the first inquiry to the database and obtaining the at least one of the plurality of pieces of compressed data from the database as the response result of the first inquiry;
a fifth step of obtaining, by the computer, the plurality of pieces of time-series data by decompressing the at least one of the plurality of pieces of compressed data which has been obtained as the response result of the first inquiry;
a sixth step of executing, by the computer, the second inquiry for the obtained plurality of pieces of time-series data;
a seventh step of extracting, by the computer, a plurality of pieces of any data from the obtained plurality of pieces of time-series data, based on a response result of the second inquiry; and
an eighth step of generating, by the computer, an output result by extracting data to be output to the client computer from the plurality of pieces of any data which has been extracted in the seventh step.

2. The database management method according to claim 1, wherein each of the plurality of pieces of compressed data is compressed data obtained by compressing the plurality of pieces of time-series data into a given time unit,
wherein the second inquiry is an inquiry for searching a first data range where a given threshold condition is satisfied, from the plurality of pieces of time-series data,
wherein, in the sixth step, the computer gives flags to the plurality of pieces of time-series data included in the first data range, and
wherein, in the seventh step, the computer extracts a second data range which includes the first data range, based on the flags given to the plurality of pieces of time-series data.

3. The database management method according to claim 2, wherein the second data range includes:
a third data range for extracting the plurality of pieces of time-series data that precedes, by a first length of time, an oldest piece of the time-series data within the first data range; and a fourth data range for extracting the plurality of pieces of time-series data that follows, at a gap of a second length of time, a latest piece of the time-series data within the first data range.

4. The database management method according to claim 2, wherein the eighth step includes a step of extracting the plurality of pieces of time-series data at a given time interval out of the plurality of pieces of time-series data within the second data range.

5. The database management method according to claim 1, wherein the database stores the plurality of pieces of compressed data to which feature information is added, the feature information is used as a search key,
wherein the first inquiry includes the feature information, and
wherein the first inquiry is an inquiry for searching for the at least one of the plurality of pieces of compressed data to which the feature information, that matches the feature information included in the first inquiry, is added.

6. The database management method according to claim 5, wherein the feature information is at least one of a maximum value, a minimum value, an average value, a variance value, and a specific point in a frequency spectrum among the plurality of pieces of time-series data prior to compression for obtaining the plurality of pieces of compressed data.

7. The database management method according to claim 1, wherein the first inquiry is an SQL for searching the database for the at least one of the plurality of pieces of compressed data, and
wherein the second inquiry is a CQL for extracting the plurality of pieces of any data from the plurality of pieces of time-series data.

8. A computer for managing a database, comprising:
a processor, and
a memory connected to the processor,
the database storing a plurality of pieces of compressed data which are compressed based on a given condition,
the computer being configured to:
analyze a query to the database which is received from a client computer coupled to the computer;
generate a first inquiry for searching the database for at least one of the plurality of pieces of compressed data, based on a result of the analysis of the received query;
generate a second inquiry for executing a search of a plurality of pieces of time-series data obtained from the at least one of the plurality of pieces of compressed data, which is a response result of the first inquiry, based on the result of the analysis of the received query;
issue the first inquiry to the database and obtain the at least one of the plurality of pieces of compressed data from the database as the response result of the first inquiry;
obtain the plurality of pieces of time-series data by decompressing the at least one of the plurality of pieces of compressed data which has been obtained as the response result of the first inquiry;
execute the second inquiry for the obtained plurality of pieces of time-series data;
extract a plurality of pieces of any data from the obtained plurality of pieces of time-series data, based on a response result of the second inquiry; and
generate an output result by extracting data to be output to the client computer from the extracted plurality of pieces of any data.

9. The computer according to claim 8,
wherein each of the plurality of pieces of compressed data is compressed data obtained by compressing the plurality of pieces of time-series data into a given time unit,
wherein the second inquiry is an inquiry for searching a first data range where a given threshold condition is satisfied, from the plurality of pieces of time-series data, and
wherein the computer is further configured to:
give flags to the plurality of pieces of time-series data included in the first data range, in a case of executing the second inquiry for the obtained plurality of pieces of time-series data; and
extract a second data range which includes the first data range, based on the flags given to the plurality of pieces of time-series data, in a case of extracting the plurality of pieces of any data from the obtained plurality of pieces of time-series data based on the response result of the second inquiry.

10. The computer according to claim 9,
wherein the second data range includes:
a third data range for extracting the plurality of pieces of time-series data that precedes, by a first length of time, an oldest piece of the time-series data within the first data range; and
a fourth data range for extracting the plurality of pieces of time-series data that follows, at a gap of a second length of time, a latest piece of the time-series data within the first data range.

11. The computer according to claim 8,
wherein the database stores the plurality of pieces of compressed data to which feature information is added, the feature information is used as a search key,
wherein the first inquiry includes the feature information, and,
wherein the first inquiry is an inquiry for searching for the at least one of the plurality of pieces of compressed data to which the feature information, that matches the feature information included in the first inquiry, is added.

12. The computer according to claim 11,
wherein the feature information is at least one of a maximum value, a minimum value, an average value, and a variance value among the plurality of pieces of time-series data prior to compression for obtaining the plurality of pieces of compressed data.

13. The computer according to claim 8
wherein the first inquiry is an SQL for searching the database for the at least one of the plurality of pieces of compressed data, and
wherein the second inquiry is a CQL for extracting the plurality of pieces of any data from the plurality of pieces of time-series data.

14. A sensor network system comprising:
a sensor for measuring a physical quantity of a sensing target;
a computer for collecting, as time-series data, the physical quantity measured by the sensor; and
a management server for storing the time-series data from the computer in a database,
the computer having a first processor and a first memory connected to the first processor,
the management server having a second processor and a second memory connected to the second processor,
the computer and the management server being coupled to each other via a network, the database storing a plurality of pieces of compressed data which are obtained by compressing a plurality of pieces of time-series data based on a given condition, the management server being configured to:

analyze a query to the database which is received from a client computer coupled to the management server via the network;

generate a first inquiry for searching the database for at least one of the plurality of pieces of compressed data, based on a result of the analysis of the received query;

generate a second inquiry for executing a search of the plurality of pieces of time-series data obtained from the at least one of the plurality of pieces of compressed data which is a response result of the first inquiry, based on the result of the analysis of the received query;

issue the first inquiry to the database and obtain the at least one of the plurality of pieces of compressed data from the database as the response result of the first inquiry;

obtain the plurality of pieces of time-series data by decompressing the at least one of the plurality of pieces of compressed data which has been obtained as the response result of the first inquiry;

execute the second inquiry for the obtained plurality of pieces of time-series data;

extract a plurality of pieces of any data from the obtained plurality of pieces of time-series data, based on a response result of the second inquiry; and generate an output result by extracting data to be output to the client computer from the extracted plurality of pieces of any data.

15. The sensor network system according to claim 14, wherein each of the plurality of pieces of compressed data is compressed data obtained by compressing the plurality of pieces of time-series data into a given time unit, wherein the second inquiry is an inquiry for searching a first data range where a given threshold condition is satisfied, from the plurality of pieces of time-series data, and wherein the management server is further configured to:

give flags to the plurality of pieces of time-series data included in the first data range, in a case of executing the second inquiry for the obtained plurality of pieces of time-series data; and extract a second data range which includes the first data range, based on the flags given to the plurality of pieces of time-series data, in a case of extracting the plurality of pieces of any data from the obtained plurality of pieces of time-series data based on the response result of the second inquiry.

16. The sensor network system according to claim 15, wherein the second data range includes:

a third data range for extracting the plurality of pieces of time-series data that precedes, by a first length of time, an oldest piece of the time-series data within the first data range; and a fourth data range for extracting the plurality of pieces of time-series data that follows, at a gap of a second length of time, a latest piece of the time-series data within the first data range.

17. The sensor network system according to claim 14, wherein the database stores the plurality of pieces of compressed data to which feature information is added, the feature information is used as a search key, wherein the first inquiry includes the feature information, and wherein the first inquiry is an inquiry for searching for the at least one of the plurality of compressed data to which the feature information, that matches the feature information included in the first inquiry, is added.

* * * * *